US006263492B1

United States Patent
Fraley et al.

(10) Patent No.: US 6,263,492 B1
(45) Date of Patent: Jul. 17, 2001

(54) RUN TIME OBJECT LAYOUT MODEL WITH OBJECT TYPE THAT DIFFERS FROM THE DERIVED OBJECT TYPE IN THE CLASS STRUCTURE AT DESIGN TIME AND THE ABILITY TO STORE THE OPTIMIZED RUN TIME OBJECT LAYOUT MODEL

(75) Inventors: Christopher Lee Fraley; Michael Halcoussis, both of Woodinville; Christopher Alan Zimmerman; Alan W. Carter, both of Bellevue; Scott Michael Wiltamuth, Seattle; Gary S. Burd, Kirkland; C. Douglas Hodges, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/870,171

(22) Filed: Jun. 6, 1997

(51) Int. Cl.[7] ....................................................... G06F 9/44
(52) U.S. Cl. ........................................ 717/5; 717/6; 717/9
(58) Field of Search ................................... 395/701, 702, 395/703, 683; 707/103; 709/303; 717/5, 6, 9

(56) References Cited

U.S. PATENT DOCUMENTS

| 4,575,579 | 3/1986 | Simon et al. | 178/4 |
| 5,247,669 | * 9/1993 | Abraham et al. | 707/103 |

(List continued on next page.)

FOREIGN PATENT DOCUMENTS

| 0749081A1 | 5/1996 | (EP) . |
| WO 96/30864 | 10/1996 | (WO) . |

OTHER PUBLICATIONS

Laurence Vanhelsuwe, *Mastering Java Beans*, "Chapter 2, Java Beans: An Overview," Sybex Inc., pp. 40–66, 1997.

Laurence Vanhelsuwe, *Mastering Java Beans*, "Chapter 7, Customizing Beans," Sybex Inc., pp. 344–404, 1997.

(List continued on next page.)

Primary Examiner—Tariq R. Hafiz
Assistant Examiner—Todd Ingberg
(74) Attorney, Agent, or Firm—Klarquist Sparkman Campbell Leigh & Whinston, LLP

(57) ABSTRACT

A componentizing object designer is used to define a componentization of visual forms and other object-oriented technologies. The componentized object designer includes a set of tightly integrated protocols enabling Component Object Model (COM) objects to replace standard built-in visual form and other objects. The componentized object designer allows the design-time object and the run-time object to differ in implementation. The componentized object designer allows class identifiers for the run-time objects which are different than design-time objects. With a different class identifier, the run-time object can be saved as an object which is radically different from the design-time object. This enables the run-time object to be stored in a different object library than the design-time object. The componentized object designer allows for different persistence formats to be saved for run-time objects. The persistence formats for the run-time objects can be significantly smaller in size compared to the original design-time objects. This is important when the run-time object needs to be downloaded over a computer network like the Internet or an intranet.

38 Claims, 14 Drawing Sheets

U.S. PATENT DOCUMENTS

| | | | |
|---|---|---|---|
| 5,305,195 | | 4/1994 | Murphy .................................... 705/1 |
| 5,347,632 | | 9/1994 | Filepp et al. .................... 395/200.32 |
| 5,463,769 | * | 10/1995 | Tate et al. ............................. 395/685 |
| 5,491,820 | | 2/1996 | Belove et al. ........................... 707/3 |
| 5,560,014 | * | 9/1996 | Imamura ............................... 395/701 |
| 5,572,643 | | 11/1996 | Judson ............................ 395/200.48 |
| 5,642,511 | * | 6/1997 | Chow et al. ......................... 395/701 |
| 5,652,888 | * | 7/1997 | Burgess ................................ 395/683 |
| 5,732,271 | * | 3/1998 | Berry et al. ......................... 395/683 |
| 5,740,549 | | 4/1998 | Reilly et al. . |
| 5,761,499 | | 6/1998 | Sonderegger . |
| 5,778,227 | * | 7/1998 | Jordan ................................. 395/682 |
| 5,872,974 | * | 2/1999 | Mezick ................................ 395/701 |
| 5,878,425 | * | 3/1999 | Redpath .............................. 707/102 |
| 5,893,118 | | 4/1999 | Sonderegger . |

OTHER PUBLICATIONS

Zane Thomas et al., *Visual Basic 4 How–To*, "Chapter 2, Forms," The Waite Group, Inc., pp. 45–152, 1995.

Aaron Walsh, *Foundations of Java Programming for the World Wide Web*, "Chapter 7, Java Development Environment," IDG Books Worldwide, Inc., pp. 171–191, 1996.

Jurgen Kleinoder et al., "MetaJava: An Efficient Run–Time Meta Architecture for Java™," *Proceedings of IWOOOS*, pp. 54–61, 1996.

Karl Dakin, "The Transaction–Based Pricing Trend," *IEEE Software*, pp. 96–97, 1996.

Williams, A.; "Visual Basic 5 and ActiveX Controls"; Dr. Dobbs Journal; vol. 22, No. 3, p. 74(8), Mar. 1997.*

Chappell, D.; "Understanding ActiveX and OLE"; Microsoft Press, pp. 203–235, Sep. 1996.*

Walsh, Aaron E., "Foundations of Java Programming for the World Wide Web", IDG Books, Chapters 5,8–9, Mar. 30, 1996.*

"Using Java" Special Edition, Que Books, Chapters 7.10 & 13–14, May 20, 1996.*

Inside Ole, 2d Ed., Microsoft Press, 1194 pp, 1995.

ActiveX Designer Programmer's Reference, Microsoft Corporation, 100 pages, 1996.

* cited by examiner

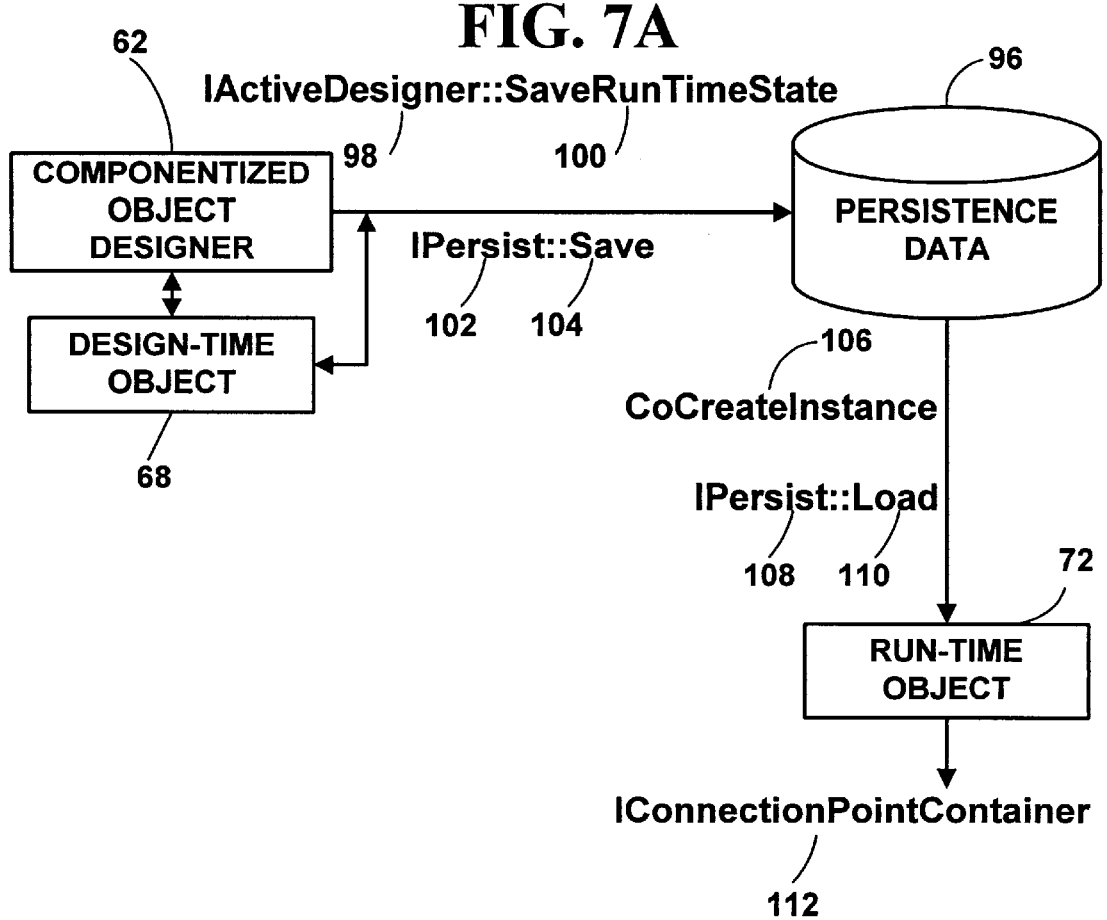

RUN TIME OBJECT LAYOUT MODEL WITH OBJECT TYPE THAT DIFFERS FROM THE DERIVED OBJECT TYPE IN THE CLASS STRUCTURE AT DESIGN TIME AND THE ABILITY TO STORE THE OPTIMIZED RUN TIME OBJECT LAYOUT MODEL

FIELD OF INVENTION

The present invention relates to the design of object-oriented computer software. More particularly it relates to the componentization and optimization of run-time objects created with object designers.

BACKGROUND AND SUMMARY OF THE INVENTION

Object oriented programming is used to design computer software that is easy to create, cost effective to modify, and reusable. Object oriented programming objects are pieces of computer software that include object data and information and provide services through "object methods" (also called object operations or object functions). The object methods typically operate on private data such as instance data or object state data that the object owns. A collection of objects make up an "object class," which is sometimes called an "object type." An object class acts as a template that describes the behavior of sets of objects. An object's implementation is typically encapsulated, and is hidden from public view. Object private instance data can only be accessed by object methods private to the object class. Object public instance data is accessed through a public object interface.

The Component Object Model (COM) and Distributed Component Object Model (DCOM) are models used for object-oriented programming. The COM and DCOM specify how objects interact and communicate within a single application, a distributed application or between applications (e.g., client/server applications) by defining a set of standard interfaces. Object interfaces are groupings of semantically related functions through which a client application accesses the services of a server application.

Object Linking and Embedding (OLE), such as OLE Version 2 and ActiveX Controls by Microsoft Corporation of Redmond, Wash. are based in part on the Component Object Model. They allow the creation of objects which operate on object data through defined object interfaces, rather than operating on the applications responsible for the data. ActiveX controls are based in part on OLE technologies. An ActiveX control is an object with properties such as color, shape and event notifications (e.g., "someone has clicked on me"). OLE and ActiveX controls are known to those skilled in the art.

An object designer is a top-level software component that runs within a dedicated design environment. Object designers provide features which can be used and customized by developers to develop objects or classes of objects for use in their applications, components, etc. The Forms object class (i.e., graphical form .FRM) provided with the Visual Basic programming language by Microsoft Corporation is one type of object designer.

For example, the supplier of a large management information system (MIS) application might develop an object designer that contains forms and controls unique to its databases. Database programmers at customer sites can then use the designer to design local applications that access the database and perform specific query and update tasks.

As another example, a multimedia design package for object-oriented applications used on a computer network like the Internet or an intranet might include an object designer that allows developers to edit text and graphics. Using such a designer, a developer could create a "Happy Birthday" object that contains the text "Happy Birthday!", a sound clip of a birthday song, and a graphical image of a cake, with graphical candles blazing.

An object designer manages the design-time aspects of an object by visually designing objects as well as managing the run-time aspects of the object it designs. The object designer creates and destroys windows (e.g., windows within one of the windowed operating systems by Microsoft Corporation), handles the user interaction, and controls the look and feel of the designer within the visual host environment. It also provides information about the objects in the designer and allows property browsers, wizards (e.g., help wizards), and other tools to manipulate the objects.

Using an object designer, developers can create and manipulate objects and modify the properties of these objects. The customizations become part of the data used at run-time in an executable application making use of these objects. In the current art, a run-time object which makes use of the objects are actually another instance of the object designer itself. Thus, the object designer is a monolithic object designer which must support both design-time and run-time behaviors. Also, the data used at run-time is the same data that is used at design-time when loading the object for further manipulation.

As is known in the art, an object designer class is used to create a new instance of a design-time object. Customizations and property changes made in the design-time object are saved in a storage medium for later use. When the customizations and property changes are saved, a developer can later make further modifications without keeping the design-time object loaded in memory. A new instance of the design-time object is created and re-initialized from the data saved in storage. At run-time, the object designer class is used to instantiate a run-time object using the data saved in storage which includes a design-time object.

Developers can also write code to further customize and manipulate the properties, methods, and events of the run-time objects they create. This customization code is not managed by the object designer, but rather is managed by the development environment itself.

There are several problems associated with an object designer class which implements both run-time objects and design-time objects. The design-time object and run-time object will often differ in functionality. For example, the design-time object displays a grid for laying out object controls, while the run-time object has no need for such functionality. As another example, the design-time object is visible (e.g., it is used to design an object with a user interface and contains components like grids, etc.), while the run-time object may be invisible (e.g., used to query a database) and not require a user interface during run-time. As a result, a library, such as a dynamic link library (.DLL) used to implement the object designer class is significantly larger than it needs to be since a large portion of the design-time functionality (e.g., the design-time user interface used to create the object) is not used at run-time. The presence of unnecessary design-time code in a library used at run-time significantly impacts the resources of a computer that the run-time object is executed on. The run-time object will require more time to load into memory and more time to execute since it contains design-time code which is not used at run-time.

Another problem associated with an object designer class which implements both run-time objects and design time objects is that an originating developer who distributes the object library (because it is required to create run-time objects) under some agreement (e.g., a license) is also distributing the design-time functionality. A receiving developer who receives the object designer can potentially create new run-time applications using the embedded design-time functionality of the object designer library. This use of the design-time objects might be beyond the scope of the distribution agreement intended by the originating developer who distributed the object. Thus, the originating developer could potentially lose revenue or other benefits that were negotiated under the original distribution agreement.

Yet another problem is that run-time objects created by the object designer have to be the same object class as the design-time objects. This is because the object designer is the object class implementing both the run-time objects and the design-time objects. This limits the number of object classes for which run-time objects can be created with object designers.

Yet another problem is that the data needed to instantiate run-time objects is saved in the same persistence (i.e., non-volatile) format as the design-time objects. It is often desirable to save the run-time data in a persistence format different from the design-time objects. For example, a graphical form at design-time may have a design grid setting. When saving the form information at design-time, it is desirable to save the grid setting in a persistence format so a developer does not have to reset the grid setting each time the graphical form is accessed. However, the grid settings are not used in the run-time object since the form layout cannot be changed at run-time. As a result, the run-time object persistence state contains design-time information which is not needed. This makes the run-time persistence state information much larger than it needs to be since the run-time object persistence state cannot be separated from the design-time persistence state information. When the run-time object is downloaded via the Internet, an intranet or other computer network, unnecessary design-time persistence information is also downloaded. This significantly increases the download time and the associated delay for a user.

Yet another problem is that when run-time object data and design-time object data are the same, the run-time data cannot be optimized for maximized performance since the design-time object data cannot be removed. In a typical programming environment, a run-time application is optimized to maximize its run-time performance when it is compiled by a compiler into an executable application (e.g., in C++ the source file .CPP is compiled into an optimized executable .EXE file).

Yet another problem is that object designers are typically inseparable from the application framework for which they were designed. Object designers built into a particular design tool have object properties unique to the design tool and cannot be used directly by other design tools. This limits the portability of the object designers to other development environments.

In accordance with an illustrative embodiment of the present invention, the problems associated with a monolithic object designer class are overcome. A method of designing objects with a componentized object designer is used. The componentized object designer includes an object designer class which is used to create a design-time object, and one or more separate run-time object classes. The method includes using a componentized object designer to create an instance of a design-time object. The design-time object is used to create multiple application specific objects. The object properties, object methods and object events of the application specific objects are manipulated with the design-time object. A run-time object is created with the design-time object by selecting one or more of the manipulated application specific objects. This method allows the creation of a run-time object different from the design-time object and a run-time object which comprises an object class different from the run-time object.

The componentized object designer in the present invention can also be used to create run-time files in a pre-determined persistence format usable by applications other than the componentized object designer. The run-time files created are in a format that is different than that normally created by the componentized object designer for run-time use. For example, the componentized object designer may create run-time files in Hyper Text Markup Language (HTML) format that are used by an Internet browser. The Internet browser can then view and/or manipulate the run-time files created in HTML by the componentized object designer.

A method of creating run-times files with formats for applications other than the componentized object designer is presented. The method includes using a componentized object designer to create an instance of a design-time object. The design-time object is used to create multiple application specific objects. The object properties, object methods and object events of the application specific objects are manipulated with the design-time object. The design-time object saves one or more of the application specific objects in a pre-determined persistence file format in run-time files that can be used by applications other than the componentized object designer.

The foregoing and other features and advantages of an illustrative embodiment of the present invention will be more readily apparent from the following detailed description, which proceeds with reference to the accompanying drawings.

BRIEF DESCRIPTION OF THE DRAWINGS

FIG. 7A is a block diagram illustrating the creation of a run-time object.

DETAILED DESCRIPTION OF A PREFERRED EMBODIMENT

Figure 1:
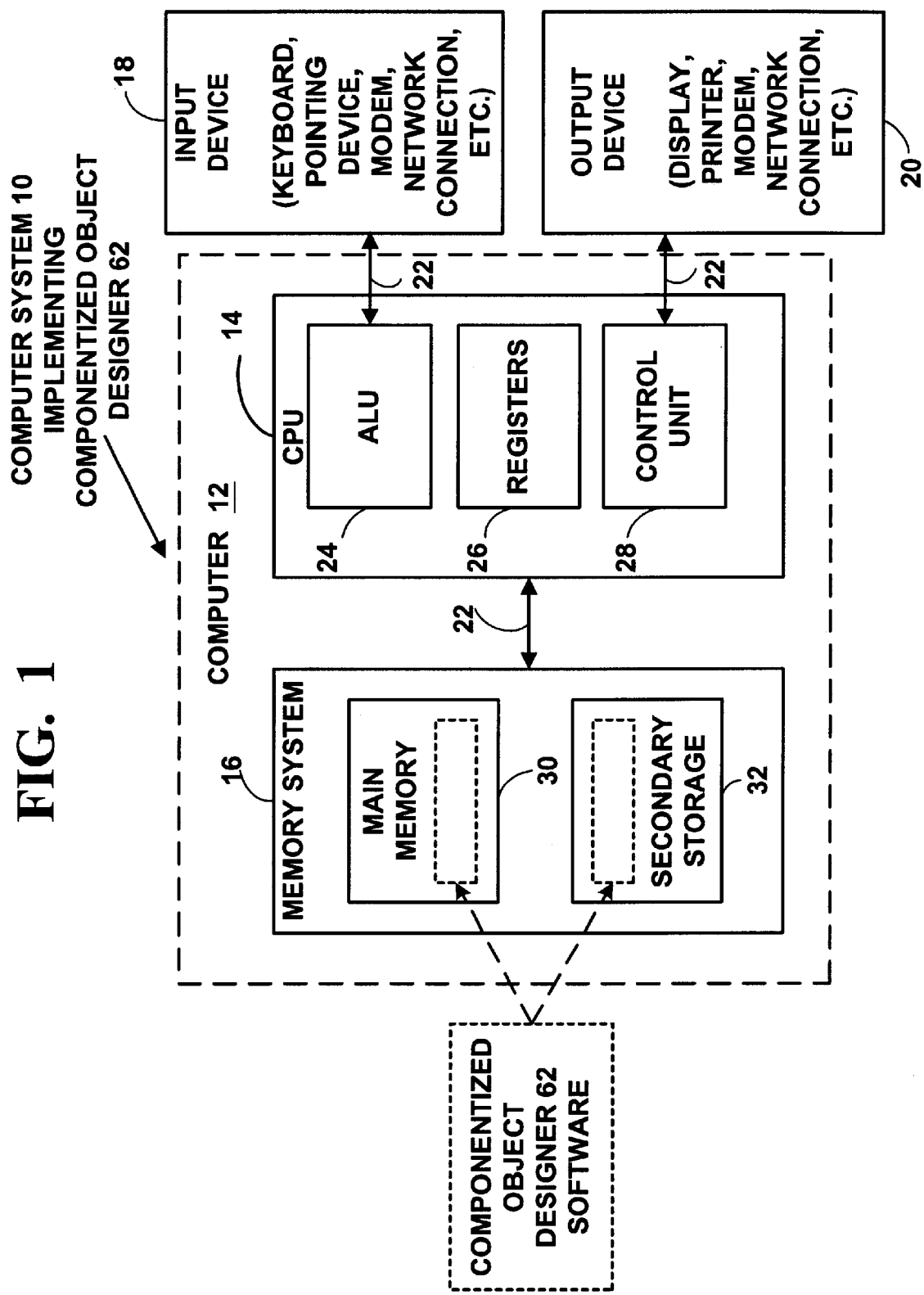
FIG. 1 is a block diagram of a computer system used to implement an illustrative embodiment of the present invention

Referring to FIG. 1, an operating environment for the preferred embodiment of the present invention is a computer system 10 with a computer 12 that comprises at least one central processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g., a microphone, etc.), or any other device providing input to the computer system 10. The output device 20 can comprise a display, a printer, an audio device (e.g., a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software instructions which controls the computer system's operation and the allocation of resources. The application program is a set of software instructions that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote. Those skilled in the art will also recognize many other configurations of these and similar components which can also comprise computer system 10.

In an illustrative embodiment of the present invention, the computer system 10 preferably uses the Windows 95 client/server operating system. However, other client/server operating systems (e.g. Windows NT, Windows CE, OS/2, by IBM, etc.) could also be used. A client/server operating system is an operating system which is divided into multiple processes of two different types: server processes, each of which typically implements a single set of services, and client processes, which request a variety of services from the server processes. Object oriented programming may be used to design the client/server operating system, and applications which run under the client/server operating system, where objects represent system resources.

For example, the Windows 95 client/server operating system provides shareable resources, such as files, memory, processes and threads, which are implemented as "objects" and are accessed by using "object services." As is well known in the art, an "object" is a data structure whose physical format is hidden behind an object type definition. Data structures, also referred to as records or formats, are organization schemes applied to data so that it can be interpreted and so that specific operations can be performed on that data. Such data structures impose a physical organization on the collection of data stored within computer memory 16 and represent specific electrical, magnetic or organic elements.

An "object type," also called an "object class," comprises a data-type, services that operate on instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table containing a pointer to each object member function (i.e., sometimes known as an object method) defined in the object's class, and a data block containing the current values for each object variable (i.e., data members, sometimes known as object properties). An application makes reference to an object through an object pointer. An application obtains this object reference by using some type of function call (direct or implied) in which that function allocates an object block in computer memory, initializes the function table, and returns the reference to the computer memory to an application. The computer memory may be local or distributed on one or more remote computers.

The Component Object Model (COM) and Distributed Component Object Model (DCOM) are models used for object-oriented programming. The COM and DCOM specify how objects within a single application or between applications (e.g. client/server applications) interact and communicate by defining a set of standard interfaces. Interfaces are groupings of semantically related functions through which a client application accesses the services of a server application.

Object Linking and Embedding (OLE), such as OLE Version 2 and ActiveX Controls by Microsoft Corporation of Redmond, Wash., are based in part on the Component Object Model and allow the creation of objects of different formats which operate on data through defined interfaces, rather than operating on the applications responsible for the data. ActiveX controls are based in part on OLE technologies. Object data can be embedded within an object, or linked to it, so that only a link reference to the data is stored in the object.

Figure 2:
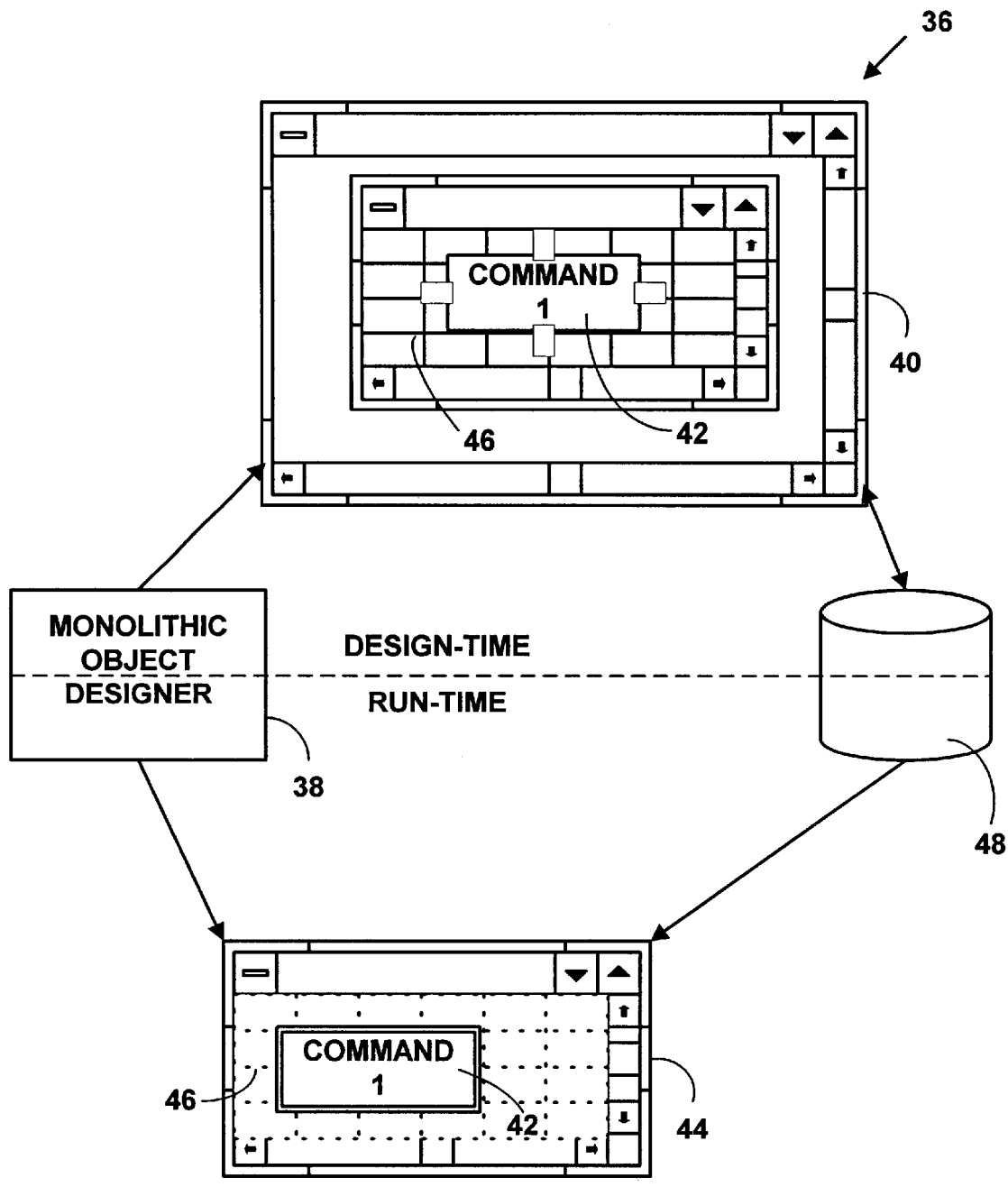
FIG. 2 is a block diagram illustrating a monolithic object designer from the prior art.

FIG. 2 illustrates a monolithic object designer environment 36 from the prior art. A monolithic object designer 38 is used to create a new instance of a design-time object 40. The new instance of design-time object 40 is used to create an object 42 (e.g., "command 1" button) that will be included in a run-time object 44. The design-time object typically includes a grid 46 for positioning object 42 and other functionality to design objects. The objects created by object designer 40 are saved in a database 48. At run-time, monolithic object designer 38 is used to create an instance of run-time object 44 with object 42 using data from database 48. Run-time object 44 contains data from design-time object 40 (e.g., grid 46 which is not needed at run-time) and run-time object specific data. A run-time object created with data from a design-time object wastes a significant amount of computer resources.

Figure 3:
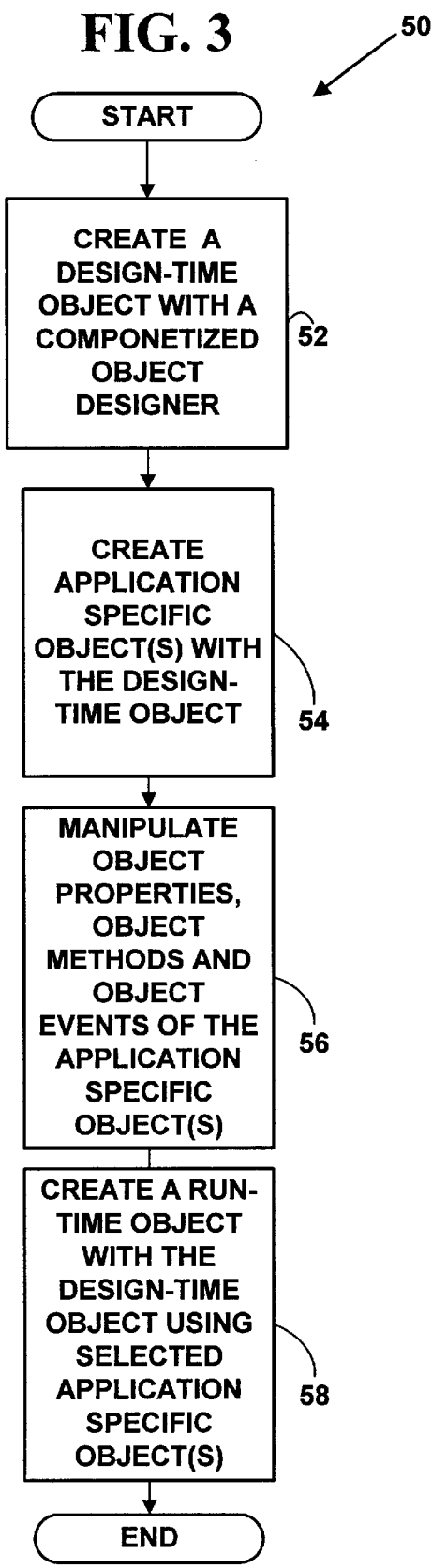
FIG. 3 is a flow diagram illustrating a method of creating an object with a componentized object designer.

FIG. 3 is a flow diagram illustrating a method of creating an object with a componentized object designer. As is shown in FIG. 3, an illustrative embodiment of the present invention uses method 50 to design objects for an object-oriented software application with a componentized object designer. Componentized object designers provide a visual design-time interface which is used for creating objects. A developer decides how to structure the design-time objects and run-time objects that are created with the componentized object designer. Run-time objects which are a different object class than the design-time objects can be created with a componentized object designer.

In method 50, a design-time object is created with a componentized object designer at step 52. The componentized object designer includes an object designer class and one or more separate run-time object classes. The design-time object is used to create multiple application specific objects at step 54. The design-time object is used to manipulate the object properties, object methods and object events of the multiple application specific objects at step 56. One or more of the multiple application specific objects will be used by the design-time object to create a run-time object. A run-time object is created and manipulated by the design-time object by selecting one or more of the multiple application specific objects created at step 58. In an illustrative embodiment of the present invention, the run-time class to be used for the run-time object is determined by the design-time object. In an alternative embodiment of the present invention, the componentized object designer determines the run-time class to be used. The run-time object created contains no design-time object functionality. In an alternative embodiment of the present invention, the run-time object contains a subset of design-time functionality, but less than the entire set of design-time functionality. The run-time object is built into an executable application and executed on computer system 10. Each of the steps of method 50 will be explained in detail below.

Figure 4:
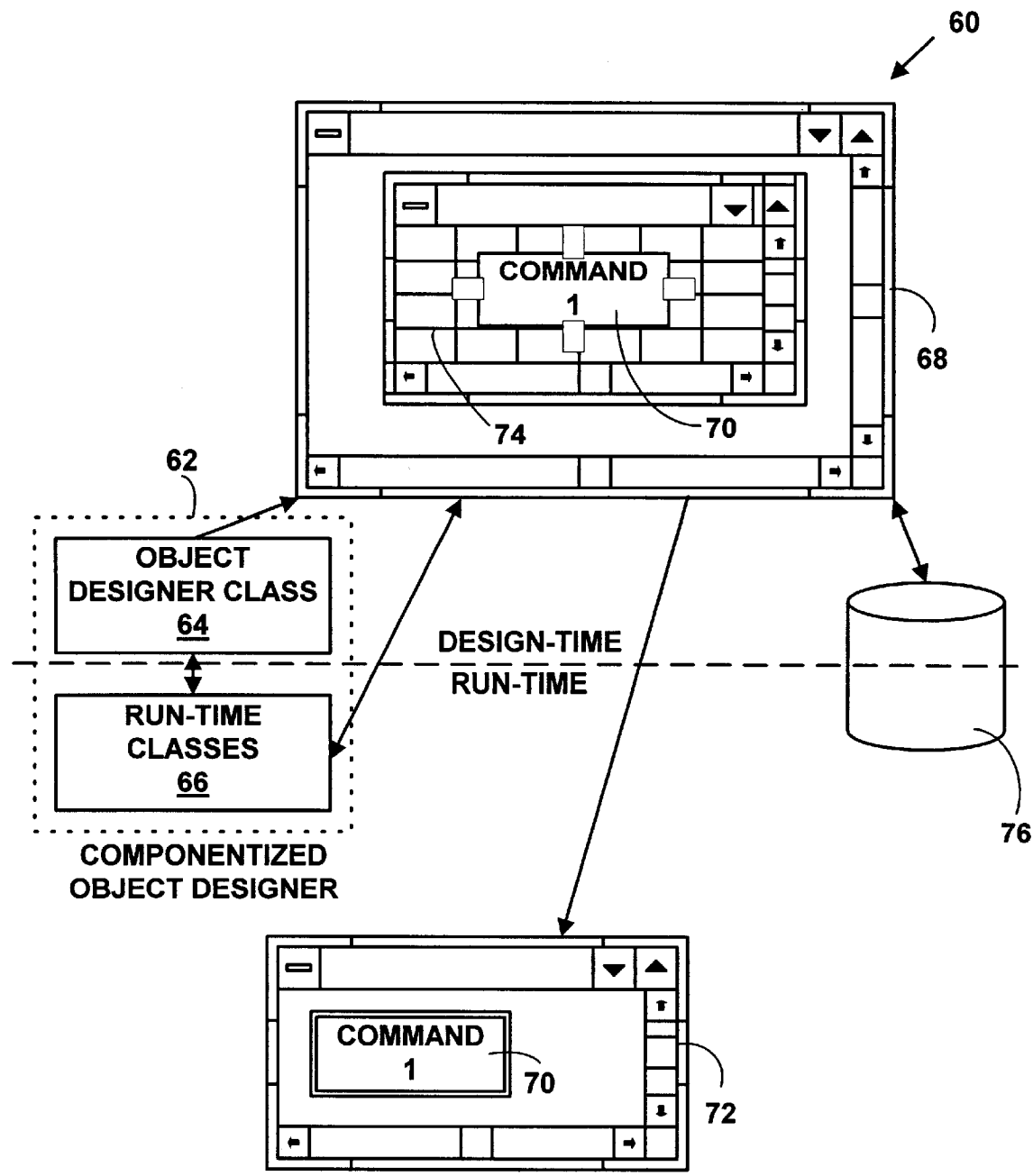
FIG. 4 is a block diagram illustrating a componentized object designer environment illustrating the method of FIG. 3.

FIG. 4 is a block diagram illustrating components of a componentized object designer environment 60. In an illustrative embodiment of the present invention, a componentized object designer 62 includes an object designer class 64 which is separate from one or more run-time object classes 66. Object designer class 64 is used to create a new instance of a design-time object 68. The new instance of design-time object 68 is used to create one or more objects 70 (e.g., "command 1" button) that will be included in a run-time object 72. Design-time object 68 typically includes a grid 74 for positioning the one or more objects 70 and other design functionality (not shown in FIG. 4). The objects created by object designer class 64 are saved in data storage 76. Data storage 76 can be computer memory, a hard disk, or other magnetic, optical or organic storage known in the art.

To create run-time object 72, design-time object 68 determines what run-time object class to use from the one or more run-time object classes 66 of componentized object designer 62. The selected run-time class 66 is used by the design-time object to create an instance of run-time object 72, which is created using objects 70 from data storage 76. In an illustrative embodiment of the present invention, run-time object 72 contains no design-time object functionality (e.g., there is no grid 74 in run-time object 72). In an alternative embodiment of the present invention, the run-time object contains a subset of design-time functionality, but less than the entire set of design-time functionality.

Componentized Object Designers and the Component Object Model

The COM and DCOM are standards that define how object-oriented applications expose objects using object interfaces. Using these object standards, object classes can be created that comply with the COM and DCOM. ActiveX compound documents (formerly OLE compound documents) and ActiveX controls are two such object classes; componentized object designer 62 represents a third.

ActiveX compound documents integrate unstructured data from an arbitrary data source. ActiveX compound documents are known to those skilled in the art. For more information see Inside OLE, 2nd Edition, by Kraig Brockschmidt, Microsoft Press, 1995. ActiveX controls and OLE controls allow objects with properties such as color, shape, etc., and event notifications capabilities (e.g., "someone has clicked on me", or "I received a message"). ActiveX and OLE controls are known to those skilled in the art. For more information on OLE controls see OLE Controls Inside Out, by Adam Denning, Microsoft Press, Redmond, Wash., 1995.

Componentized object designers 62 based on the COM or DCOM provide several significant benefits. They fit neatly into the existing COM/DCOM architecture and make it easy for programmers to create classes that comply with the COM/DCOM standards. In addition, these object designers simplify and streamline the development process by hiding object complexity from a developer.

Figure 5:
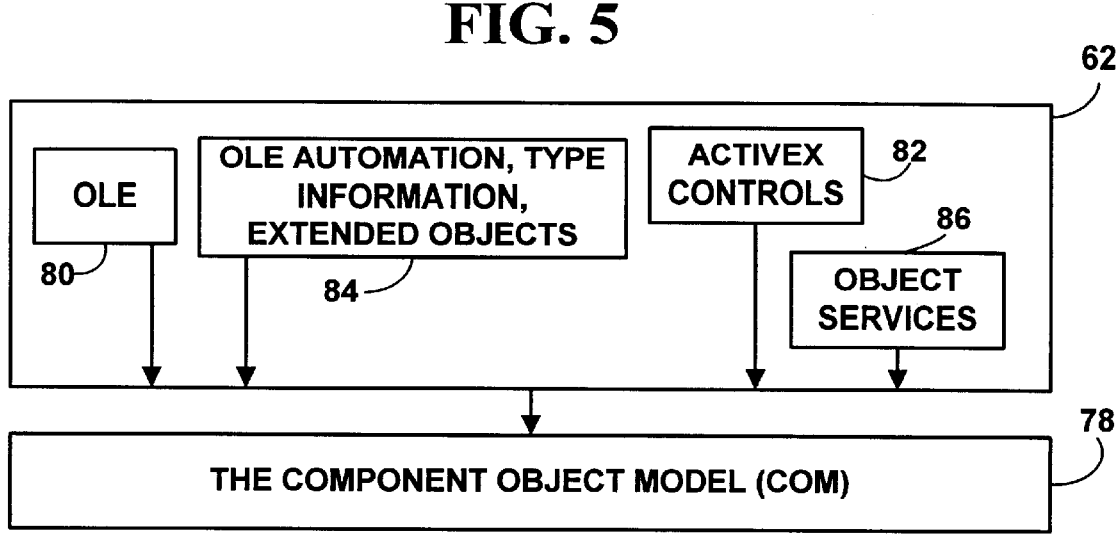
FIG. 5 is block diagram illustrating interfaces to the Component Object Model.

FIG. 5 illustrates how componentized object designer 62 interfaces with the COM 78. In an illustrative embodiment of the present invention, a componentized object designer 62 interfaces into the COM via an OLE interface 80, an ActiveX control interface 82, an OLE automation type information and extended object interface 84, and an object services interface 86. However, more or fewer interfaces into the COM (or the DCOM) could also be used by componentized object designer 62.

Components of a Componentized Object Designer

Figure 6:
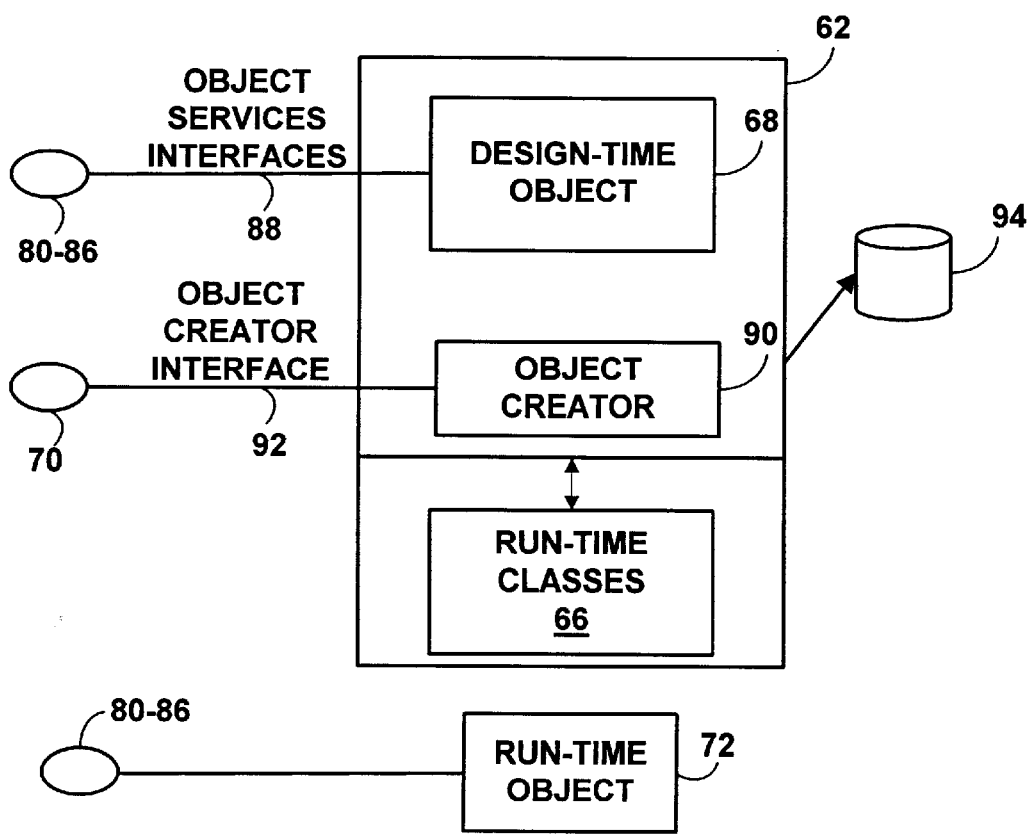
FIG. 6 is a block diagram illustrating the components of a componentized object designer.

FIG. 6 shows components of componentized object designer 62 for an illustrative embodiment of the present invention. However, more or fewer components can also be used. A design-time object 68 (also called a visual designer) is used to handle the user interface at design time. The object interfaces 80–86 are used for support of object services interface 88. Object creator 90 (also called an "object class factory"), and an object creator interface 92 are used to create application specific objects 70 (illustrated as one object in FIG. 4 and FIG. 6, but not limited to one object). The componentized object designer 62 is registered in a system-wide registry 94 (e.g., the Windows operating system registry), so that object-oriented applications and development tools can find componentized object designer 62. However, other object-oriented components, interfaces and registries could also be used. Run-time classes 66 are used to create run-time object 72. Run-time object 72 is typically contained in an object-oriented application (not shown in FIG. 4 or FIG. 6) that is executed on computer system 10. Each of the components of the componentized object designer 62 are explained below. Hereinafter, the "componentized object designer" 62 will be referred to as an "object designer" 62 for simplicity.

Design-time object 68 (FIG. 4) is created at step 52 (FIG. 3) after adding object designer 62 (FIG. 4) to an object-oriented software development project. Design-time object 68 typically includes a visual user interface and manages the design-time aspects of the object designer 62. Design-time object 68 creates and destroys handles (e.g., Microsoft Windows), handles user interaction, and controls the look and feel of the object designer 62 within the host computer environment (e.g., computer system 10).

It also creates at step 54 (FIG. 3) multiple application specific objects 70 (one of which is shown in FIG. 4) for the object designer 62. Design-time object 68 provides object information about the objects used with the object designer 62. This object information is used by design-time object 62, browsers (e.g., property inspectors, property pages), wizards (e.g., help wizards), and other tools to manipulate object properties, object methods and object events of the multiple application specific objects 70 created.

Using design-time object 68, developers can not only create application specific objects 70 and manipulate their object properties, methods, and events, but also can write application-specific code to manipulate the objects they create. The developer's code and objects become part of run-time object 72 that is created using design-time object 68 and the application specification objects 70. Run-time object 72 may be the same as design-time object 68, or it may be different. In an illustrative embodiment of the present invention, run-time object 72 is not the same as design-time object 68 and does not contain design-time object 68.

Object designer 62 may have different design-time objects 68 and run-time objects 72 for many reasons. Design-time object 68 and run-time object 72 may differ in implementation. For example, design-time object 68 may be visible, but run-time object 72 may be invisible. An application typically requires a different visual interface at run-time since much of the design-time functionality is not necessary. Licensing requirements may also be different at design-time and at run-time.

If run-time object 72 is different from design-time object 68, object designer 62 provides information describing the types and visual representation (if any) for run-time object 72. Languages such as Visual Basic by Microsoft Corporation use this information when creating an executable object-oriented application. Object designer 62 also implements an object creator 90 (FIG. 6) that can create instances of application specific objects 70. However, object creator 90 and interface 92 could also be external to the object designer 62.

If run-time object 72 and design-time object 68 are the same, object designer 62 uses the same object type information and object creator 68 at both design-time and run-time. For example, object designers such as the "Forms 96" designer by Microsoft Corporation that define graphical forms or graphical forms packages used to display graphical form information for a user, often require the same type information at design-time as at run-time. Their design-time and run-time objects are usually the same.

Other kinds of object designers may have different requirements for type information or user interfaces, and therefore implement separate design-time and run-time objects. Object designer 62 allows developers to devise queries to remote databases, for example, may not need a user interface at run-time. Object designer 62 used for creating multimedia objects is likely to need different object type information at run-time than at design-time.

The object interfaces 80–86 (FIG. 5) of object designer 62 (FIG. 6) provide the following features used by the object designer: object linking and embedding, in-place object activation, the ability for an object to work as an in-process server, and object programmability using OLE automation or other object automation methods. In addition, the object designer 62 in the present invention implements object creator (i.e., a class factory) 90 to create instances of design-time object 68 and run-time objects 72. The OLE IClassFactoy or IClassFactory2 object interfaces are used as object creator 90, and are known to those skilled in the art. However, other object creators could also be used. Object creator 90 creates an instance of a desired object and provides an object creator interface 92. For more information on the OLE object class factory, see the Inside OLE book cited above.

In an illustrative embodiment of the present invention, object designer 62 registers in a "Component Categories" in a system registry 94 (e.g., the Windows operation system registry). Registration enables objects to be found by applications that use them. Object designers typically use the OLE DLLRegisterServer and DLLUnregisterServer DLL entry-points to register. However, other registration methods could also be used.

DLLRegisterServer stores information about design-time object 68 and run-time object 72 in the operating system registry 94 (FIG. 6). DLLUnregisterServer removes this information from the registry.

Registering object designer 62 under the Windows operating system is much like registering an OLE or ActiveX control. With the following exceptions, object designer 62 registers the same information as controls: Object designer 62 registers CATID_Designer in the Implemented Categones subkey of the CLaSs IDentifier (CLSID) key. The value of CATID_Designer is defined in an object designer 62 header file "Designer.h." However, other header files could also be used. Object designer 62 registers the CLSID of run-time object 72 under the CLSID key. Registering the CLSID of run-time object 72 is required only if run-time object 72 is different from design-time object 68. Object designer 62 typically omits the Control subkey of the CLSID key.

Object designer 62 registers the Component Categories subkey, using the ICatRegister interface. The following pseudo-code example in Table 1 registers CATID_Designer and the object designer's 62 CLSID.

TABLE 1

```
hr = CoCreateInstance (CLSID_StdComponentCategoriesMgr, NULL,
       CLSCTX_INPROC_SERVER, IID_|CatRegister,
       (void **)&pCatRegister);
if (SUCCEEDED(hr)) {
       pCatRegister->RegisterClassImp|Categories(
       CLSID_DifferentDesigner, 1, (GUID *)&CATID_Designer
       );
              pCatRegister->Release();
};
```

The example in Table 1 calls OLE CoCreateInstance to create an instance of the component categories manager and returns pCatRegister, a pointer to the ICatRegister interface. It then calls the RegisterClassImplCategories method, passing the CLSID of the designer and CATID_Designer to register the object designer 62 under the Implemented Categories subkey. Finally, it releases its reference to the ICatRegister interface. However, other registration methods could also be used. This registration can be done on a local or a remote computer.

If run-time object 72 is different from design-time object 68, run-time object's 72 CLSID is registered under the CLSID key. RegSetValue is used for this task, as the following pseudo-code example in Table 2 shows.

TABLE 2

```
I = RegSetValue (HKEY_CLASSES_ROOT, szInstanceInfo, REG_SZ szInstCLSID,
              sizeof(szInstCLSID));
```

However, other registration methods could also be used. In the above example in Table 2, HKEY_CLASSES_ROOT indicates where the object information is stored. The REG_SZ parameter denotes the type of information being supplied, typically being of the type REG_SZ. The szInstanceInfo and szInstanceCLSID parameters give the subkey and the value to be stored for it. In this example, these parameters have been defined to contain the CLSID of the run-time object. An example instance of a CLSID of run-time object 72 stored in registry 94 is shown in the pseudo-code in Table 3.

TABLE 3

```
static char szInstanceInfo [] =
"CLSID‡‡{d342aea0-97d0-11cf-a0d2-00aa0062be57}‡‡Instance CLSID";
static char szInstCLSID [] ="{fdc139b0-9800-11cf-a0d2-00aa0062be57}";
```

Object designer 62 also registers the following information. The CLSID of design-time object 68; the value of CATID_Designer under the Implemented Categories subkey; the CLSID of run-time object 72 (if different from design-time object 68) under the CLSID key; the license key (if a license is required) under the Licenses key; the Apartment threading model in the Threading Model subkey; and the OLE miscellaneous status flags for the visual designer under the MiscStatus subkey. Under the MiscStatus key, the DVASPECT flag is set to one to indicate DVASPECT_CONTENT. If run-time object 72 does not have a visual interface, the OLEMISC_INVISIBLEATRUNTIME flag is included with the OLE miscellaneous status flags. However, more or less information could also be registered. Object designer 62 can be as simple as an object that makes itself visible at design time, or as complex as a graphical form that hosts inter-active controls for a computer network such as the Internet or an intranet. Design-time object 68 and run-time object 72 can be registered on a local or remote computer.

Existing Technologies Used by Object Designers

Table 4 lists the existing technologies used by object designer 62 in an illustrative embodiment of the present invention.

TABLE 4

| Feature | Technologies Applied |
| --- | --- |
| Properties | Automation, property notifications, property pages, connectable objects |
| Events | Events, Automation, connectable objects |
| Visual representation | Compound documents |
| Persistence | Structured storage (plus extensions) |
| Design-time layout | Compound documents, drag and drop |
| Container event handlers | Events, Automation |
| Container extended objects | Controls, property pages |
| Container keyboard | Controls |

However, more or fewer existing technologies, or new technologies can also be used in object designer 62.

New Technologies used by Object Designers

New technologies defined for object designer 62 are listed in Table 5.

TABLE 5

| Feature | Technology |
| --- | --- |
| Provide access to groups of features without delegating to many individual interfaces. | Services |
| Allow an object's type information to change, adding properties, methods, and events. | Dynamic type information |
| Add new interfaces for visual designer, cod navigation, object selection. | Object extensions |
| Ability to specify a run-time object which is different than the design-time object | Object designer extensions |
| Ability to specify a file-format in lieu of a run-time object which is different than the file-format used by the design-time object | Object designer extensions |

However, more or fewer new technologies could also be used.

Object Interfaces Used with Object Designers

Table 6 lists OLE object-oriented interfaces used with object designer 62 in an illustrative embodiment of the present invention. However, more or fewer object interfaces could also be used or implemented. In addition, other object-oriented interfaces could also be used.

TABLE 6

| Object Interface | Design-Time Object | Visual Run-Time Object | Nonvisual Run-Time Object |
| --- | --- | --- | --- |
| IOleObject | Yes. | Yes. | Optional. |
| IOleInPlaceObject | Yes. | Yes. | Does not apply. |
| IOleInPlaceActiveObject | Yes | Yes. | Does not apply. |
| IProvideClassInfo or IProvideDynamicClassInfo | Yes. | Yes. | Yes. |

TABLE 6-continued

| Object Interface | Design-Time Object | Visual Run-Time Object | Nonvisual Run-Time Object |
|---|---|---|---|
| IActiveDesigner | Optional. | Does not apply. | Does not apply. |
| IPersistStorage, IpersistStream, or IPersistStreamInit | Yes. | Yes. | Yes. |
| IConnectionPoint, IConnectionPointContainer | Yes. | Yes. | Yes. |
| IPropertyNotifySink, IPerPropertyBrowsing, IPropertyPage, IPropertyPage2, ISpecifyPropertyPages | Optional. | Optional. | Does not apply. |
| IDispatch | Yes. | Yes. | Yes. |
| IQuickActivate | Optional. | Optional. | Does not apply. |
| IViewObject, IViewObject2, IViewObjectEx | Optional. | Optional. | Does not apply. |
| IOleControl | Optional. | Optional. | Optional. |
| IOieDocument, IOleView | Optional. | Optional. | Optional. |

Creating the Design-Time Object

Design-time object 68 negotiates the interaction between object designer 62, the host object-oriented development environment (hereinafter the "host environment" for simplicity), and the end user. It typically includes a visual user interface, which collects and saves information from the end user to create run-time object 72.

Table 7 summarizes the functions of design-time object 68 created at step 52 (FIG. 3) for object designer 62 in an illustrative embodiment of the present invention. Not all of these capabilities must be provided by design-time object 68, and more or fewer capabilities or functions could also be used.

Suggested Interfaces for the Design-time Object

In an illustrative embodiment of the present invention, design-time object 68 implements the following OLE/ActiveX interfaces: IOleObject, IOleInPlaceActiveObject, and IOleInPlaceObject to allow design-time object 68 to be an embedded object and to provide a visual designer. Design-time object 68 implements IDispatch to invoke object properties and methods, and IConnectionPoint and IConnectionPointContainer to handle object events. It also implements either IProvideClassInfo or IProvideDynamicClassInfo to supply object type or dynamic object type information. However, more or fewer OLE interfaces, or other object oriented-interfaces could also be used. Detailed information on the OLE interfaces can be found in the Inside OLE book cited above.

In addition, design-time object 68 implements at least one of the OLE persistence interfaces (IPersistStorage, IPersistStream, IPersistStreamInit) to save persistence (i.e., non-volatile) data from one work session to the next. If design-time object 68 does not implement the new componentized object designer IActiveDesigner interface which is described below, the host environment uses one of the OLE persistence interfaces or other object-oriented interfaces to save persistence data for run-time object 72.

Optional Interfaces for Design-Time Object

If object designer 62 creates run-time object 72 that is different than design-time object 68, as is done for an illustrative embodiment of the present invention, design-time object 68 implements a new IActiveDesigner object-oriented interface, which will be explained below. The IActiveDesigner interface allows run-time object 72 to be manipulated and componentized by design-time object 68 created with object designer 62. The IActiveDesigner interface also includes an object method that provides access to the designer's programmability object (an IDispatch interface) for object add-ins.

To allow end users to view and change object properties, design-time object 68 supplies the OLE

TABLE 7

| Function | Developer Action |
|---|---|
| Be an embedded object. | Implement IOleObject. |
| Provide a visual designer. | Implement IOleInPlaceObject and IOleInPlaceActiveObject. |
| Save and load persistence data. | Implement IPersist and IPersistStream, IPersistStreamInit, or IPersistStorage. |
| Use services (optional). | Use IServiceProvider. |
| Handle events. | Implement IConnectionPointContainer and IConnectionPoint. |
| Support a property browsing mechanism (optional). | Implement IDispatch, IConnectionPointContainer, IConnectionPoint, IPropertyNotifySink, IPerPropertyBrowsing, IPropertyPage, IPropertyPage2, ISpecifyPropertyPages. Use IPropertyPageSite. |
| Provide convenient navigation to and from code (optional). | Use SCodeNavigate. |
| Provide type information to the host. | Implement IProvideClassInfo or IProvideDynamicClassInfo. |
| Create a different run-time object (optional). | Implement IActiveDesigner. |
| Support programmability by add-in objects (optional). | Implement IActiveDesigner. |
| Support "Save As Text" (optional). | Implement IPersistPropertyBag. |
| Use ambient properties (optional). | Implement IOleControl. Use IOleControlSite. |
| Provide DocObject support | Implement IOleDocument, IOleView. |
| Ability to specify a run-time object which is different than the design-time object | Implement IActiveDesigner. |
| Ability to specify a file-format in lieu of a run-time object which is different than the file-format used by design-time object | Implement IActiveDesigner. |

IPerPropertyBrowsing, ISpecifyPropertyPages, and ICategorizeProperties interfaces. Supporting an object property browser is strongly recommended, though it is not required for design-time object 68. Design-time object 68 may also choose to implement the OLE IOleControl; IViewObject, IViewObject2, IOleDocument, IOleView and IViewObjectEx; IQuickActivate interfaces; and any other interfaces that may be helpful for browsing object properties. Detailed information on the OLE interfaces discussed above can be found in the Inside OLE book cited above.

Designing the Run-Time Object

After designing design-time object 68 with the interfaces described above and creating application specific objects 70 (i.e., objects that provide functionality for the application that will be executed), run-time object 72 is built. Run-time object 72 can be in one of three formats shown in Table 8.

return type information about run-time object 72. Detailed information on these OLE objects can be found in the Inside OLE book cited above.

In addition, run-time object 72 should support the same persistence interfaces that design-time object 68 supports. The persistence interfaces allow run-time object 72 to be loaded with the appropriate object type information and data. However, in an alternative embodiment of the present invention, persistence object interfaces for run-time object 72 different from than design-time object 68 could also be used.

Other OLE interfaces are optional. Run-time object 72 may need to support IQuickActivate; IViewObject, IViewObject2, or IViewObjectEx; or IOleControl or IOleDocument, IOleView. The OLE property browsing interfaces IPerPropertyBrowsing and ISpecifyPropertyPages typically are not needed at run time.

TABLE 8

1. The same object for both design-time object 68 and run-time object 72.
2. Run-time object 72 presents a visual interface to a user but has different object type information then design-time object 68.
3. Run-time object 72 does not present a visual interface to a user and has different object type information than design-time object 68.

The disadvantage of run-time object 72 being the same as design-time object 68 is that run-time object 72 may contain object type information and code that is used only at design-time, but is not needed at run-time (e.g., grid 46 of FIG. 2). This increases the size of run-time object 72 and can result in poor performance. In addition, a developer may desire to license run-time object 72 separately from design-time object 68. In an illustrative embodiment of the present invention, run-time object 72 is not the same as design-time object 68, so run-time objects 52 with the characteristics of 2 or 3 of Table 8 are created.

The object interfaces and application specific objects 50 required for run-time object 72 depend on whether it presents a visual user interface. Like design-time object 68, a visual run-time object provides in-place visual object activation capabilities. A nonvisual run-time object, on the other hand, doesn't use these features. Table 9 summarizes the functions of run-time object 72.

TABLE 9

| Function | Developer Action |
| --- | --- |
| Be an embedded object. | Implement IOleObject. |
| Provide a visual interface (optional). | Implement IOleInPlaceObject and IOleInPlaceActiveObject. |
| Supply type information. | Implement IProvideClassInfo or IProvideDynamicClassInfo. |
| Load persistence data. | Implement IPersistStorage, IPersistStream, or IPersistStreamInit. |
| Handle events. | Implement IConnectionPointContainer and IConnectionPoint. |
| Be a DocObject | Implement IOleDocument, IOleView. |

However, more or fewer run-time object functions could also be used.

If run-time object 72 is visible, it will implement and contain some of the same interfaces as design-time object 68. The OLE IOleObject, IOleInPlaceObject, and IOleIuPlaceActiveObject interfaces provide the basic features for embedded, in-place active objects with or without a visual interface. IConnectionPoint and IConnectionPointContainer are used to support object events. IDispatch is used for invoking an object, its properties and methods. IProvideClassInfo or IProvideDynamicClassInfo (if design-time object 68 implements it) is used. These OLE interfaces A run-time object 72 that does not have a visible interface should set the OLEMISC_INVISIBLEATRUNTIME bit in the OLE miscellaneous status flags to indicate there is no visible interface. This bit is set through the IOleObject interface and appears in the registry entry for run-time object 72. However, other flags could also be used to indicate that run-time object 72 does not have a visual interface.

If run-time object 72 does not have a visual interface, interfaces required for OLE embedding and in-place visual object activation can be eliminated making run-time object 72 much smaller than design-time object 68. Nonvisual run-time objects use the IDispatch interface to invoke object properties and methods; the OLE IConnectionPoint and IConnectionPointContainer interfaces to handle events; the OLE IProvideClassInfo or IProvideDynamicClassInfo interfaces for object type information; and the same persistence interface design-time object 68 supports. However, more or fewer object-oriented interfaces could also be used for run-time object 72.

Object designer 62 relies on its host environment to implement the other interfaces that are required for OLE embedding. The list includes LAdviseSink, IOleClientSite, IOeInPlaceFrame, IOleInPlaceSite, IOleInPlaceUIWindow, and IOleWindow. However, more or fewer OLE or other object-oriented interfaces could also be implemented by the host environment.

Creating the Run-Time Object Using Object Designers

When the end user wants to write code which will manipulate the properties, method, and events of run-time object 72, the host environment calls the OLE functions IProvideClassInfo or IProvideDynamicClassInfo to get the type information it needs to compile code against the run-time object's type.

FIG. 7A is a block diagram illustrating the creation of a run-time object. As is shown in FIG. 7A, before compiling the application or shifting into run mode, the host environment asks object designer 62 through design-time object 68 to save the prototypical instance state for run-time object 72 as object persistence (i.e., non-volatile) state data 96. If design-time object 68 implements the IActiveDesigner interface 98, a SaveRuntimeState object method 100 is called to save run-time object 72 persistence data. If not, it uses one of the OLE IPersist interfaces (such as IPersistStream) 102 and a call to the OLE object Save object method 104 of design-time object's 68 persistence interface is made, in the following order:

1. IPersistStreamInit
2. IPersistStream
3. IPersistStorage

However, other persistence interfaces and ordering could also be used.

OLE and ActiveX provide a set of persistence object interfaces:
IPersistStorage, IPersistStream, IPersistStreamInit, and IPersistFile to allow an object to save or load its persistence data to some type of non-volatile storage (e.g., hard disk, flash memory, etc.). The OLE persistence object interfaces are known to those skilled in the art. Detailed information on the OLE persistence object interface can be found in the Inside OLE book cited above. A brief summary of the OLE persistence object interfaces are shown below in Table 10.

TABLE 10

| OLB Persistent Object Interfaces | Brief Description of the Interface |
| --- | --- |
| IPersistStorage | The object can read and write its information in a storage hierarchy in which the object is allowed to cteate additional substorages and streams to any depth it requires. The object can also open elements and hold their pointers outside the scope of calls to the interface. |
| IPersistStream | The object can read and write its information in a single stream and must do so within the scope of calls to this interface. |
| IPersistStreamInit | Same as IPersistStream, but this interface means the object would like to be informed when it is newly created and has no persistence state as yet. The member function for this purpose does not exist in IPersistStream. |
| IPersistFile | The object can read and write its information into a completely separate file (traditional or compound) outside the scope of the Structured Storage. |

Returnng to FIG. 7A, at execution time the following steps are taken, to create object designer's 62 run-time object 72:
1. Call OLE CoCreateInstance direct method 106, passing the CLSID saved with the persistence data. Object creator 90 for object designer 62 ensures that it is properly licensed, as discussed below in greater detail.
2. Call one of the OLE IPersist interfaces 108 with Load method 110 of the persistence interface to load persistence data 96 for run-time object 72.
3. Call the OLE IConnectionPointContainer 112 or IConnectionPoint object method to connect run-time events with event handlers defined in object designer 62.

The OLE IConnectionPointContainer or IConnectionPoint methods determine whether the object (i.e., run-time object 72) has any outgoing object interfaces it wants to connect (i.e., header files with the definitions of those interfaces).

Figure 7B:
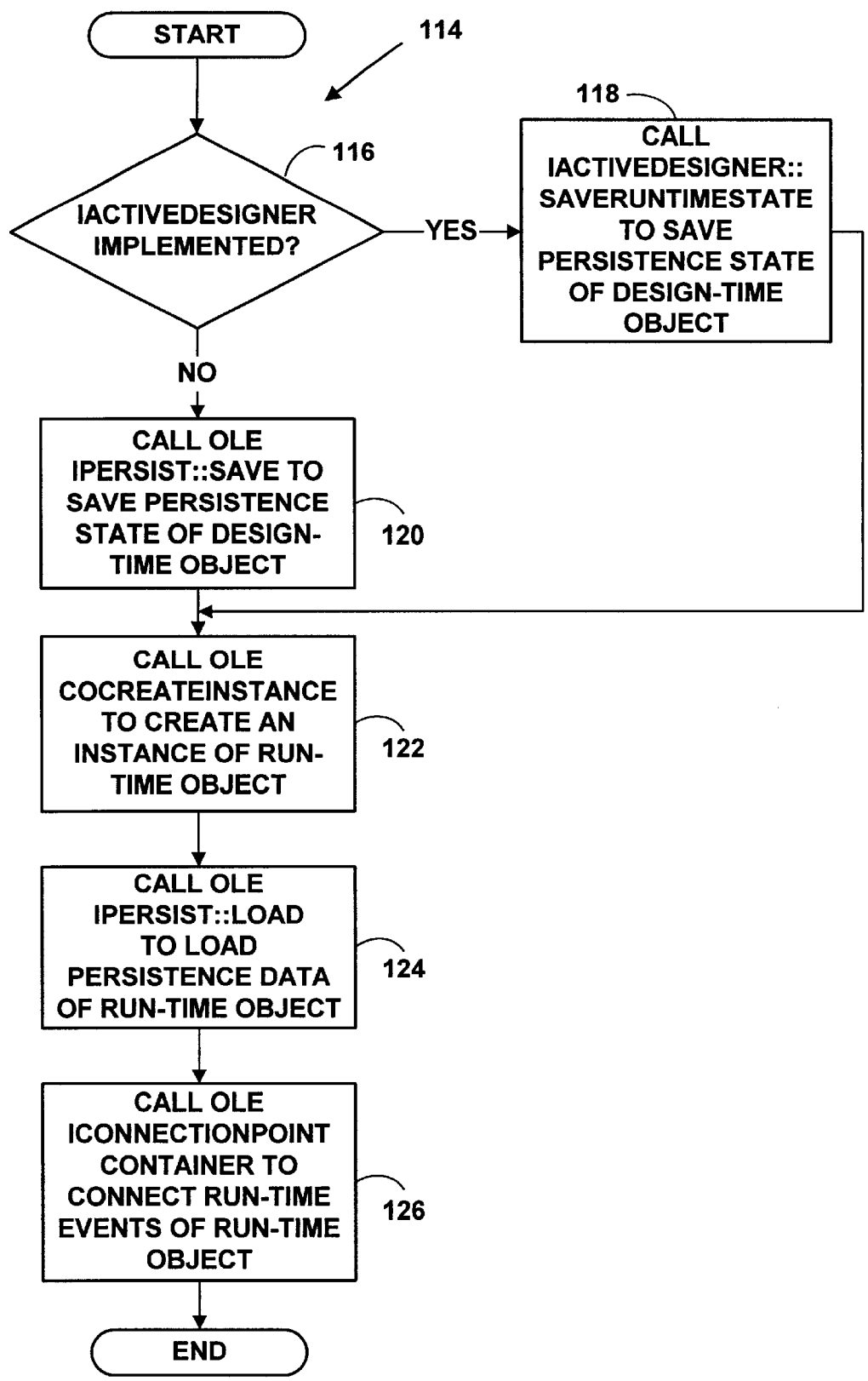
FIG. 7B is a flow diagram illustrating the creation of a run-time object shown in FIG. 7A.

FIG. 7B is a flow diagram illustrating method 114 for the creation of a run-time object 72 as illustrated by the block diagram in FIG. 7A. At step 116, if the design-time object 68 implements IActiveDesigner interface 98, then the IActiveDesigner SaveRuntimeState object method 100 is called at step 118 to save persistence data 96 for the object. If the design-time object 68 does not implement IActiveDesigner interface 98 at step 116, a call to the OLE IPersist interface 102 with Save method 104 is made at step 120 to save persistence data 96 for the object. However, other persistence interfaces can also be used. After object persistence data has been saved for the design-time object at either step 118 or 120, OLE CoCreateInstance object method 106 is called at step 122 to create an instance of run-time object 72. The OLE IPersist interface 108 with Load method 1 10 is called at step 124 to load persistence data for run-time object 72 from persistence storage 96. At step 126, the OLE IConnectionPointContainer object method 112 or the OLE IConnectionPoint object method (not shown in FIG. 7A) is called to connect run-time events in the run-time object 72 with event handlers in object designer 62. However, other object-oriented interfaces could also be used to create, load and connect run-time object 72.

Instances of design-time object 68 may be created and destroyed many times during a development session. Whenever the window in which a design-time object 68 is present is closed, the host environment typically destroys the current design-time object 68. Whenever the end user opens object designer 62 item in a window, the host environment creates a new instance of design-time object 68. Design-time object 68 also writes and loads its persistent data 96 so that design-time object 68 can replicate a design state each time the host environment creates it. When writing and loading persistence data 96 of the design-time object 68, the Save method 104 of one of the OLE IPersist interfaces 102 can be used in lieu of the SaveRunTimeState method 100 of the IActiveDesigner interface 98. This data usually is saved into a different file or storage location than the data saved to be used by the run-time object 72.

Retaining Persistence Data and Saving the Run-Time Object

Object designer 62 supports persistence interfaces to save persistence data 96 for their design-time objects 68 (including any application specific object 70) and their run-time objects 72. The host environment loads persistence data 96 to reestablish design-time object 68 or to load run-time object 72 into an application for computer execution.

To retain persistence data 96, one or more of the ActiveX or OLE persistence interfaces are implemented in both design-time object 68 and run-time object 72. A new IActiveDesigner interface may also be implemented as a persistence interface.

The IActiveDesigner interface provides a way of saving persistence data 96 when design-time object 68 and run-time object 72 need to be stored as different objects. It also provides programmability access for object add-ins as will be discussed below.

Overview of Persistence Requirements

Through the persistence interfaces, object designer 62 can save persistence information 96 for use at two different times:
1. To reestablish design-time object 68 the next time it is loaded.
2. To create and load run-time object 72.

Persistence data 76 includes object type information, object properties, and global variables such as time-out values and flags that the user has already set. If design-time object 68 supports dynamic object type information, its persistence data 76 includes a return value (e.g., the OLE return value pdwCookie) returned from GetDynamicClassInfo. The InitNew method of the persistence interfaces resets the return value to zero each time design-time object 68 is created.

If design-time object 68 implements the IActiveDesigner interface, the host environment uses the SaveRuntimeState method to save persistence data 96 for run-time object 72. Without IActiveDesigner however, run-time object 72 should be able to load itself from persistence data 96 of design-time object 68 (i.e., run-time object 72 and the design-time object 68 are the same object).

Regardless of how persistence data is saved, it is desirable that run-time object 72 implement the same set of persistence interfaces as design-time object 68 so that the host environment can load the persistence data easily and efficiently at run time.

Implementing the Persistence Interfaces

Design-time object 68 implements the OLE IPersist interface and at least one of its derived interfaces: IPersistStreamInit, IPersistStream, and IPersistStorage. However, more or fewer OLE or other object-oriented persistence interfaces could also be used. The IPersist interface is the base interface for the other three interfaces. It has one object method, GetClassID, which returns the CLaSs IDentifier (CLSID) of an object that implements one or more of the other persistence interfaces. For object designer 62, this method returns the CLSID of design-time object 68.

One or more of the other persistence interfaces should also be implemented, depending on the type and size of run-time object 72 to be built from object designer 62, and which host environment will use it.

The host environment requests a persistence interface by iteratively calling QueryInterface on object designer 62 object, passing Interface IDentifiers (IIDs) in order of preference. Different host environments may request different persistence interfaces. In general, IPersistStreamInit is the preferred interface because it is the fastest and because its InitNew object method allows the object to avoid loading itself twice (when the instance is created and again when the Load method is called). IPersistStream is fast, but does not include an InitNew method so loading optimization is lost. Some host environments, however, use IPersistStorage. Although storage persistence requires significantly more overhead, some applications may need structured storage, and some sub-objects may require it.

Object designer 62 may also implement the OLE PersistPropertyBag, which saves information about object properties and object methods in a textual format.

Stream Persistence

The OLE IPersistStream and IPersistStreamInit interfaces save and load objects from a simple serial stream. Both interfaces include the following object methods shown in Table 11.

TABLE 11

| Method | Description |
| --- | --- |
| GetSizeMax | Returns the size of the stream needed for the object. |
| IsDirty | Checks for changes to the object since it was last saved. |
| Load | Initializes the object from where it was saved. |
| Save | Saves the object to a stream. |

In addition, IPersistStreamInit has a fifth object method called InitNew, which notifies the object when it is being newly created, rather than being loaded from a saved instance. Implementing IPersistStreamInit is recommended because it is the fastest persistence interface.

Storage Persistence

The OLE IPersistStorage interface supports structured storage for embedded objects. The interface includes the following object methods shown in Table 12.

TABLE 12

| Method | Description |
| --- | --- |
| HandsOffStorage | Instructs the object to release all storage objects that have been passed to it by its container and to enter HandsOffAfterSave or HandsOffFromNormal mode. |
| InitNew | Initializes a new storage object. |
| IsDirty | Indicates whether the object has changed since it was last saved to its current storage. |
| Load | Initializes an object from its existing storage. |
| Save | Saves an object, and any nested objects that it contains, into the specified storage object. The object enters NoScribble mode. |
| SaveCompleted | Notifies the object that it can revert from NoScribble or HandsOff mode, in which it must not write to its storage object, to Normal mode in which it can. |

While the host environment typically looks for stream persistence preferentially, it can be beneficial to implement IPersistStorage to make object designer 62 as flexible and general as possible. A simple approach is to open a stream in the storage and save the required persistence data.

Implementing the new IActiveDesigner Object Interface

The IActiveDesigner object interface according to the present invention includes object methods that provide access to information about run-time object 72 of object designer 62.

The IActiveDesigner object interface includes the following object methods:

GetRuntimeClassID

GetRuntimeMiscStatusFlags

QueryPersistenceInterface

SaveRuntimeState

GetExtensibilityObject

In an illustrative embodiment of the present invention, the IActiveDesigner interfaces are used with object designer 62.

Providing Information on the Run-Time Object

The IActiveDesigner GetRuntimeClassID and GetRuntimeMiscStatusFlags object methods return information about run-time object 72. Although the information is stored in the system registry 94, host environments can query object designer 62 more efficiently than they can query the registry 94. The host environment calls the GetRuntimeClassID method to get a run-time object CLSID when it builds run-time object 72.

In the scenario, where there is no run-time object but rather a run-time file is the intended result, GetRuntimeClassID returns a special CLSID, CLSID_NULL, to indicate that there is no run-time object directly associated with this object designer.

The IActiveDesigner GetRuntimeClassID and GetRuntimeMiscStatusFlags object methods allow run-time object 72 to be saved as an object class different from design-time object 68. For example, if design-time object 68 included a first class of objects for a visual editor with a first CLSID, and run-time object 72 was being developed to query databases and did not require a visual editor or other visual user interface, run-time object 72 could be saved as a second class of objects with a second CLSID different from the first CLSID of design-time object 68. This provides significant flexibility for determining the object class used for run-time object 72.

In the following pseudo-code example shown in Table 13, object designer 62 returns the CLSID from a global constant.

TABLE 13

```
STDMETHODIMP CMyDesigner::GetRuntimeClassID
(
    CLSID *pclsid
)
{
    CHECK_POINTER(pclsid);
    *pclsid = CLSID_RuntimeInstance;
    return S_OK;
}
```

The IActive Designer GetRuntimeMiscStatusFlags object method returns status flags that are defined for object designers 62. In the following pseudo-code example shown in Table 14 the flag values are stored in the constant RUNTIME_MISCSTATUS. This object method returns the value of the constant to the caller.

TABLE 14

```
STDMETHODIMP CMyDesigner::GetRuntimeMiscStatusFlags
(
    DWORD *pdwMiscStatus
)
{
    CHECK_POINTER(pdwMiscStatus);
    *pdwMiscStatus = RUNTIME_MISCSTATUS;
    return S_OK;
}
```

Saving Run-Time Information

The IActiveDesigner QueryPersistenceInterface and SaveRuntimeState object methods allow the host environment to find and use the persistence interface for run-time object 72. These object methods typically apply to run-time object 72. Persistence data 96 for design-time object 68 are handled directly through IPersist and its derived interfaces. However, these object methods can also be applied to design-time object 68. These object methods allow run-time object persistence data to be stored in a format different from design-time object 68.

Calls to the IActiveDesigner QueryPersistenceInterface pass the Interface IDentifier (IID) of one of the persistence interfaces (e.g., IPersistStreamInit, IPersistStream, or IPersistStorage). If the object designer 62 supports the specified persistence interface, it returns S_OK; if not, it returns S_FALSE, as in the following pseudo-code example in Table 15.

TABLE 15

```
STDMETHODIMP CMyDesigner::QueryPersistenceInterface
(
    REFIID riid
)
{
    if (riid == IID_IPersistStreamInit)
        return S_OK;
    else if (riid == IID_IPersistStorage)
        return S_OK;
    else if (riid == ID_IPersistStream)
        return S_OK;
    else
        return S_FALSE;
}
```

The example in Table 15 above shows object designer 62 that supports all three OLE persistence interfaces for run-time object 72. However, not all three persistence interfaces need be supported for run-time object 72.

After it queries for a persistence interface, the host environment opens a stream or storage object, as appropriate, and calls SaveRuntimeState to save data for run-time object 72. SaveRuntimeState passes in the IID of the persistence interface, the IID of the stream or storage object, and a pointer to the stream or storage object. The following pseudo-code example in Table 16 checks to see what type of interface the host environment has passed in and sets up the pointer appropriately.

TABLE 16

```
STDMETHODIMP CMyDesigner::SaveRuntimeState
(
    REFIID riidItf,
    REFIID riidObj,
    void *pMedium
)
{
    IStream *pStream;
    long   l;
    HRESULT hr;
    LPWSTR pwsz;
    // Get an IStream.
    //
    if (riidItf == IID_IStream) {
        pStream = (IStream *)pMedium;
        pStream->AddRef();
        }
    else if (riidlft == IID_IStorage) {
        // We'll just save to the CONTENTS stream.
        //
        hr = ((IStorage *)pMedium)->
            CreateStream(s_wszRuntimeSaveStream
                STGM_WRITE |
                STGM_SHARE_EXCLUSIVE | STGM_CREATE,
                0, 0, &pStream);
        RETURN_ON_FAILURE(hr);
        }
    else {
        FAIL("Unsupported persistence interface!");
        }
    // Save some standard state information. The Load
    // routine will look for it in the stream.
    //
    hr = SaveStandardState(pStream);
    RETURN_ON_FAILURE(hr);
    // Save our property.
    //
    if (m_bstrMyString) {
        pwsz = m_bstrMyString;
        l = SysStringLen(m_bstrMyString) + 1;
    }else {
        pwsz = L"";
        l = 1;
    }
    hr = pStream->Write(&l, sizeof(l), NULL);
    RETURN_ON_FAILURE(hr);
    hr = pStream->Write(pwsz, l * sizeof(WCHAR), NULL);
    pStream->Release();
    return hr;
}
```

The above example in Table 16 saves two kinds of persistence data: standard data that is the same for all objects of this class, and a local object property that the end user can change when run-time object 72 is created. After writing the data to the stream, the sample code releases the stream pointer and returns.

Persistence data 96 includes the information needed to create an instance of run-time object 72. This might include object type information, properties, and global variables such as time-out values that may have been set at design time. When the OLE Load method of the persistence interfaces is used, code is written to load the saved information into run-time object 72. The host environment calls the OLE Load method when it creates an instance of run-time object 72.

Customizing the Development Environment

In an illustrative embodiment of the present invention, the IActiveDesigner GetExtensibilityObject object method is used to componentize a run-time object. GetExtensibilityObject object method allows a native object-oriented programming environment to be extended to use non-native objects created with a different object-oriented programming environment. The GetExtensibilityObject object method gives the host environment access to a special dispatch interface for design-time object 68. This interface need not be an interface on the object designer itself, but rather a helper object which enables manipulation of the object designer. The development environment typically exposes this object to add-ins through the development environment's extensibility objects. The GetExtensibilityObject object method allows a host development environment, which was used to create native objects, to use non-native objects when run-time object 72 is created.

The following pseudo-code example in Table 17 creates a new extensibility object and returns a pointer to its IDispatch interface for object add-ins.

TABLE 17

STDMETHODIMP CMyDesigner::GetExtensibilityObject
(
    IDispatch **ppExtensibilityObject
)
{
    if (!ppExtensibilityObject) return E_POINTER;
    *ppExtensibilityObject = new CMyAddInTopLevelAutomationObject;
    return (*ppExtensibilityObject) ? S_OK: E_OUTOFMEMORY;
}

If object designer 62 doesn't implement the GetExtensibilityObject object method, then the value E_NOTIMPL is returned. In this case, objects created with an object-oriented programming model different from the host environment cannot be used in run-time object 72.

Using Object Designers with Visual Basic

The Visual Basic programming environment is used as an exemplary environment for an illustrative embodiment of the present invention. However, the present invention is not limited to a Visual Basic programming environment and may be used in other object-oriented programming environments.

Microsoft Visual Basic (e.g., version 5.0) supports multiple kinds of object designers, including object designer 62. In an illustrative embodiment of the present invention object designer 62 can also comprise an "extended" componentized object designer. An extended componentized object designer includes the object interfaces shown in FIG. 5, the components shown in FIG. 6, as well as one or more of the optional interfaces (e.g., IActive Designer) shown in Table 6. One variety of extended componentized object designer is an ActiveX designer by Microsoft Corporation. ActiveX designers typically implement the IActiveDesigner object interface as well as other optional object interfaces shown in Table 6.

Figure 8:
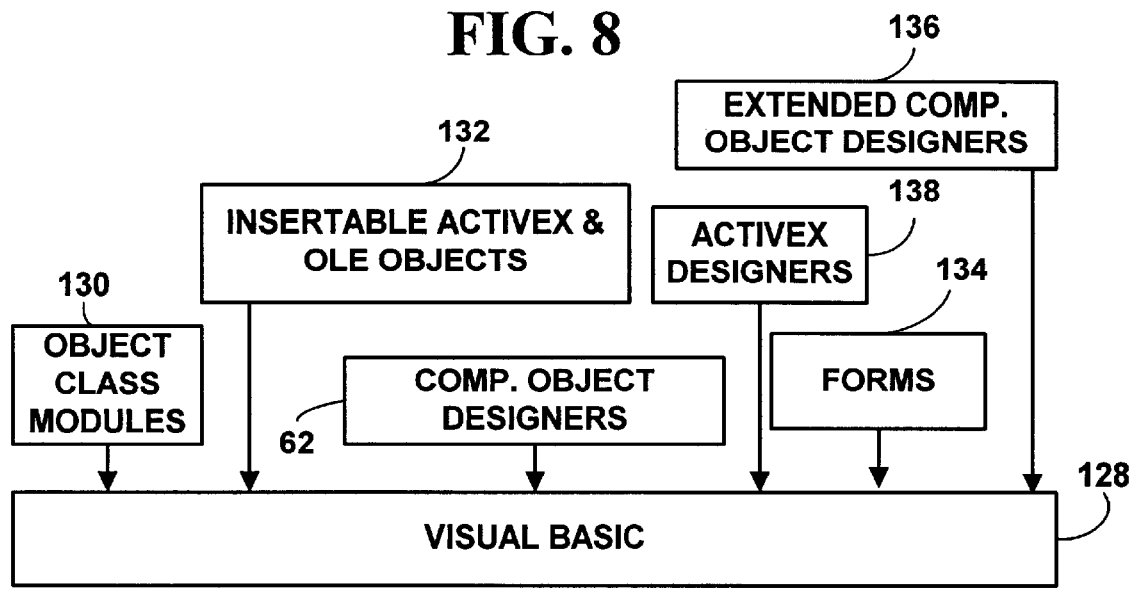
FIG. 8 is a block diagram illustrating interfaces to the Visual Basic programming language.

In the past, Visual Basic supported only a single kind of object designer, a built-in forms designer. As is shown in FIG. 8, the illustrative embodiment of the present invention uses Visual Basic 128 to provide several ways for software developers to supply custom object features including object class modules 130, insertable ActiveX and OLE objects and ActiveX controls 132, Visual Basic forms 134, object designers 62, extended componentized object designers 136, and a specific type of componentized object designer, an ActiveX designer 138.

Like Visual Basic forms (.FRM) 134, and object class modules 130, ActiveX designers 138 operate at project-level scope. ActiveX designers 138 can host standard object controls, ActiveX controls, and other objects, and can create instances of object classes defined in class modules. In addition, the code behind an ActiveX designer 138 can create instances of other forms or ActiveX controls. In the same way, the code behind a form can create an instance of another form 130 or ActiveX designer 138. As was mentioned above, an ActiveX designer 138 is a specific type of "extended" componentizing object designer 136. However, other extended componentized object designers can also be used.

Figure 9:
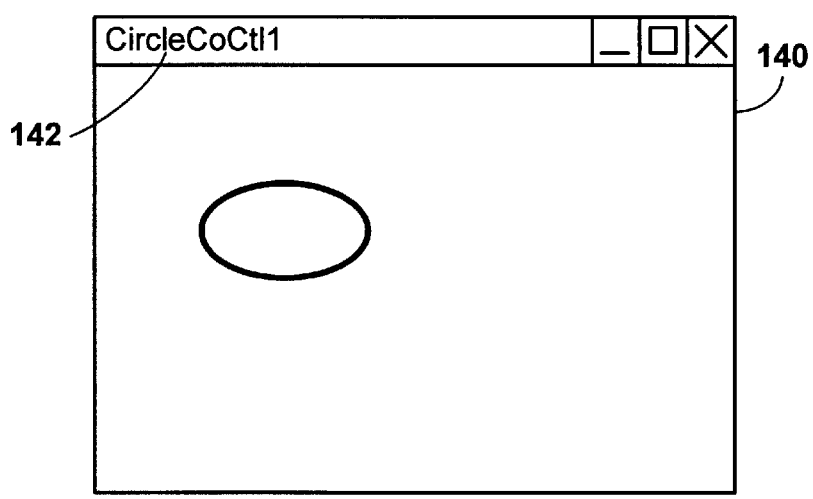
FIG. 9. is a screen display illustrating an ActiveX designer in a Visual programming language graphical frame.

In the Visual Basic environment, an ActiveX designer 138 appears in a design frame at design time, just as a form does. A design frame is a container that looks like a window and defines window-like properties, methods, and events. Visual Basic creates and manages the design frame, and the visual designer interacts with it through ActiveX interfaces. Within the frame, ActiveX designer 138 controls its own visual representation. FIG. 9 illustrates a screen display of a Visual Basic design frame 140 for an ActiveX designer 138 named "CircleCoCtl1" 142.

Visual Basic provides the frame 140. Within the frame's boundaries, ActiveX control CircleCoCtl1 142 controls the look and feel of the user interface, either handling events itself or passing them on to Visual Basic allows users to extend an object. Extending an object means changing the object's behavior by writing code to handle events and add properties, methods, and events. Using this capability, end users can create customized object classes by combining an ActiveX designer 138, a frame supplied by Visual Basic 128, and an object code module. In a similar manner, end users can attach code to documents, creating customized documents.

Creating a Visual Basic Application with an ActiveX designer

In Visual Basic, the ActiveX designer command on the Project menu adds an ActiveX designer 138 to the development environment. After adding an ActiveX designer 138, an end user can incorporate it into an executable Visual Basic program.

Table 18 below lists the steps involved in creating a simple application that uses an ActiveX designer 138. For each user step, Visual Basic takes one or more actions. The sections that follow describe these actions in detail.

TABLE 18

| User action | Visual Basic action |
| --- | --- |
| Installs an ActiveX designer. | None. |
| Adds an ActiveX designer to the environment. | Obtains the list of Active X designers. |
| Adds an instance of an ActiveX designer to the project. | Creates and initializes a visual designer. Displays the designer's user interface in a frame. |
| Browses and edits properties. | Uses property browser. Manages the user's selections. Tracks changes to type information |
| Writes code attached to an ActiveX designer. | Displays the code window. |

TABLE 18-continued

| User action | Visual Basic action |
| --- | --- |
| Builds or runs the project. | Creates a run-time object. |
| Clicks End to stop execution. | Ceases execution. |

Adding an ActiveX designer to the Visual Basic Development Environment

Figure 10:
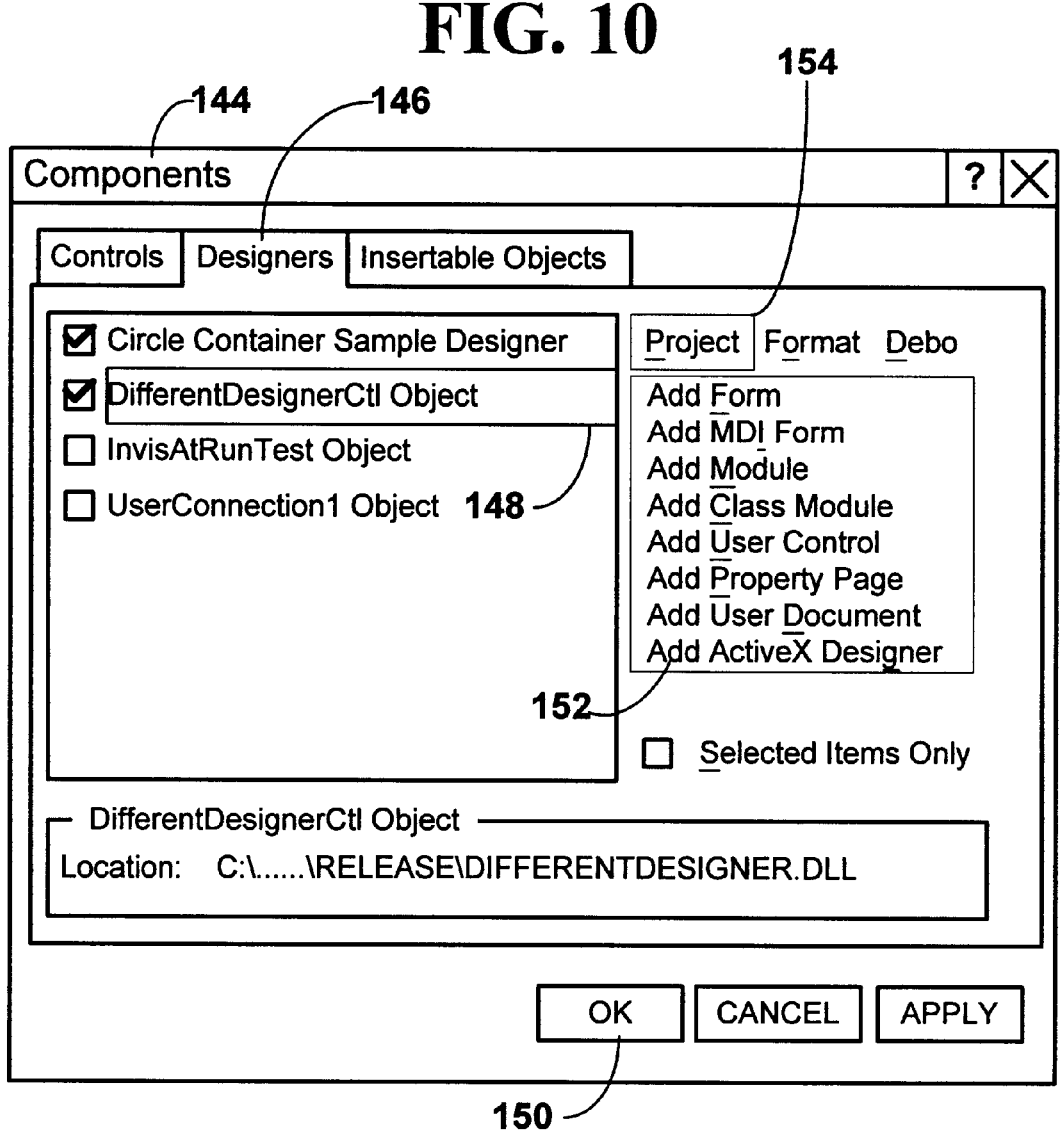
FIG. 10 is a screen display illustrating a Visual Basic interface for manipulating ActiveX designers.

To add an ActiveX designer 138 to a Visual Basic development environment, an end user takes the steps which are illustrated on the screen display shown in FIG. 10. A user clicks Components on the Project menu 154 to open the Components dialog box 144. A user clicks the Designers tab 146 in the Components dialog box 144. One or more ActiveX designers 138 are selected (e.g., designated as DifferentDesignerCtlObject). The user clicks the OK button 150.

To find out which ActiveX designers 138 are available, the host environment provided by Visual Basic searches the operating system registry 94 for entries that contain the ActiveX designer 138 component category. Using the CLasS IDentifierS (CLSIDs) and strings of these entries, it creates the list 148 of ActiveX designers 138 in the Components dialog box 144. The end user selects ActiveX designers 138 from the box; the selected designers subsequently appear on the pop-up menu displayed when the user clicks the Add ActiveX designer 152 command on the Project menu 154.

Adding an Instance of an ActiveX designer in Visual Basic

To add an instance of an ActiveX designer 138 to a project using Visual Basic, the end user clicks the Add ActiveX designer 152 command on the Project menu and selects a designer from those listed on the pop-up menu. The list contains the names of all the ActiveX designers 138 that have been added to the development environment. In response, the following steps are executed by a user:

1. Creates a design-time object 68 (FIG. 4) at step 52 (FIG. 3). Visual Basic calls the OLE function CoCreateInstance, passing the CLSID of design-time object 68, to create a design-time object to manage the user interface. The object creator 90 (i.e., the class factory) for ActiveX designer 138 ensures that any required licenses are present. If so, it creates the design-time object 68.
2. Initializes design-time object 68. Visual Basic calls the OLE function IOleObject::SetClientSite to associate the ActiveX designer 138 with a site. Then it calls the OLE function InitNew or Int method of the designer's persistence interface to load the designer's persistence data.
3. Displays design-time object 68. Visual Basic provides a frame 140 and uses ActiveX and OLE interfaces to display the user interface.

Visual Basic creates a default instance of design-time object 68 in much the same way that it creates a default instance of Visual Basic form (e.g., Form1).

Browsing and Editing Properties with Object Designers in Visual Basic

Object designers 62 are not required to support per-object property browsing, though it is recommended that they do so. An extended object designer 136 (e.g., an extended ActiveX designer 136) that implements this feature uses the ActiveX control property page interfaces to create and manage property sheets. Visual Basic provides the STrackSelection service to track the user's selections and pass them appropriately to the ActiveX designer 138. By using the service, the designer's user interface works much like selecting graphical controls on a graphical form.

Tracking Changes to Design-Time Type Information

When the end user creates at step 54 (FIG. 3) an object with object designer 62 or an extended object designer 136 (e.g., ActiveX designer 138), the type information for design-time object 68 has to change dynamically to include information about the new object instance. For example, ActiveX designer 138 uses the OLE Automation ICreateTypeInfo and ICreateTypeInfo2 interfaces to change object type information. In turn, OLE Automation triggers an ITypeChangeEvents notification to Visual Basic, which calls the designer's IProvideDynamicClassInfo interface to get the new type information. Object properties, object methods, and object events of the created or inserted application specific objects 70 can be manipulated at step 56 (FIG. 3) with design-time object 68.

Displaying a Code Window with Object Designers in Visual Basic

When an end user selects an object and clicks View Code, Visual Basic displays the default event procedure for the application specific objects 70. The end user can then write application specific code in the procedure to attach to the object. The Visual Basic SCodeNavigate service performs a similar operation. When the end user clicks on an application specific object 70 supplied by design-time object 68, object designer 62 can call this service to display the appropriate code window.

Creating a Run-Time Object with an Object Designer in Visual Basic

When a developer builds a software application with Visual Basic, object designer 62 or extended object designer 136 (e.g., the ActiveX designer 138) saves the information necessary to run the application in run-time object 72. At run time, the computer system 10 uses the saved information to load instances of run-time object 72 for execution in an executable application.

Licensing an Object Designer

In an illustrative embodiment of the present invention licensing object designer 62 support license keys which can be built into an application. Using license keys, a developer can distinguish between a license valid for creating new applications that use it (a design-time license) and a license valid to run an application that uses it (a run-time license).

One way of handling licensing is to supply a license file (.LIC). However, in the illustrative embodiment of the present invention, a license is registered in the operating system registry 94 as part of object designer 62 setup procedure. Licenses are stored under the Licenses registry subkey.

At design time, the host environment assumes that object designer 62 is appropriately licensed if object creator 90 successfully creates design-time object 68. The host environment handles all licensing through the OLE IClassFactory2 interface. When the host environment attempts to create an executable application (run-time object in a .EXE file or .DLL), it requests a license for the run-time object 72. If design-time object 68 presents a license, the host environment uses it; if no license is presented, the host environment assumes that none is required.

The Object Designer Licensing Scheme

Software components like forms 134, and ActiveX designers 138, use licenses to protect against unauthorized use. A developer creates objects that can be used to build, package, and redistribute applications that use the object components created. However, it is also desirable to prohibit developers who purchase the resulting applications from re-using a design-time object 68 in other applications without licensing object designer 62. At run-time, three licensing options are possible for object designer 62:

1. No license is required to use run-time object 72. The host environment does not save a license when it creates run-time object 72, and the object creator 90 does not request one before creating an instance.

2. The license to use design-time object 68 is sufficient to use run-time object 72. The host environment presents the stored license key to run-time object 72. Run-time object 72 verifies that the stored key matches its own copy, and execution proceeds.

3. Application requires a separate license. Each user of each compiled, executable application (.EXE) has to get a license from design-time object 68 that created run-time object 72. The host environment presents the stored license key to run-time object 72, and if run-time object 72 can verify the key, execution of the application proceeds.

However, more or fewer licensing options could also be used.

In some cases, the distinction between designing and running an application is not clear. For example, consider a spreadsheet application with an embedded licensed control (e.g., a workbook). In a sense, the workbook can be thought of as an application for distribution. A user with a copy of the workbook can modify it arbitrarily to the point where it becomes a very different application. Unless the original license key is automatically discarded, the second user has, in effect, obtained unauthorized application design rights by virtue of the original application license key. Yet many workbook changes, data entry, for example, should not necessarily invalidate the original application license.

Object designer 62 can register separate design-time and run-time license keys. Separate licensing allows developers to distribute applications built with the designer, while prohibiting them from distributing the designer itself. Developers with a run-time license can't write new applications based on run-time object 72 without first licensing design-time object 68.

Object designer 62 can be also used in applications that are not licensing-aware. Users of an application that are not licensing-aware buy a design-time (machine or user) license for the object component before the object component can be used in the host environment.

Implementing the Licensing Interfaces

To support licensing, object designer 62 implements the OLE ClassFactory2 interface, which derives from IClassFactory. The IClassFactory2 interface includes three methods for licensing:

1. GetLicInfo
2. RequestLicKey
3 CreateInstanceLic

However, more or fewer licensing methods could also be used. The interface is defined in a header file "Olectl.h." However, other header files can also be used. The LICINFO structure is used, which includes the following fields shown in Table 19.

TABLE 19

| Field | Type | Description |
| --- | --- | --- |
| cbLicInfo | long | Size of LICINFO structure |
| fRuntimeKeyAvail | BOOL | True if the object class provides a run-time key. |
| fLicVerified | BOOL | True if the license has been verified. |

The structure provides information about the licensing key. The first member, cbLicInfo, gives the size of the structure. The fRuntimeKeyAvail member is a Boolean that is TRUE if the object class provides a run-time key tha t can be built into an application.

The Boolean fLicVerified flag is set to TRUE when object designer 62 has verified that it is licensed for host environment. If object designer 62 can determine that a valid license is present before it receives a key, it sets this flag. If the current user or host environment license is supposed to override the application license corresponding to a key, object designer 62 can use fLicVerified to avoid passing the key unnecessarily. To provide maximum flexibility, license keys are defined as the value BSTR, which can be any length and can include Null characters.

Licensing in the Visual Designer

Figure 11:
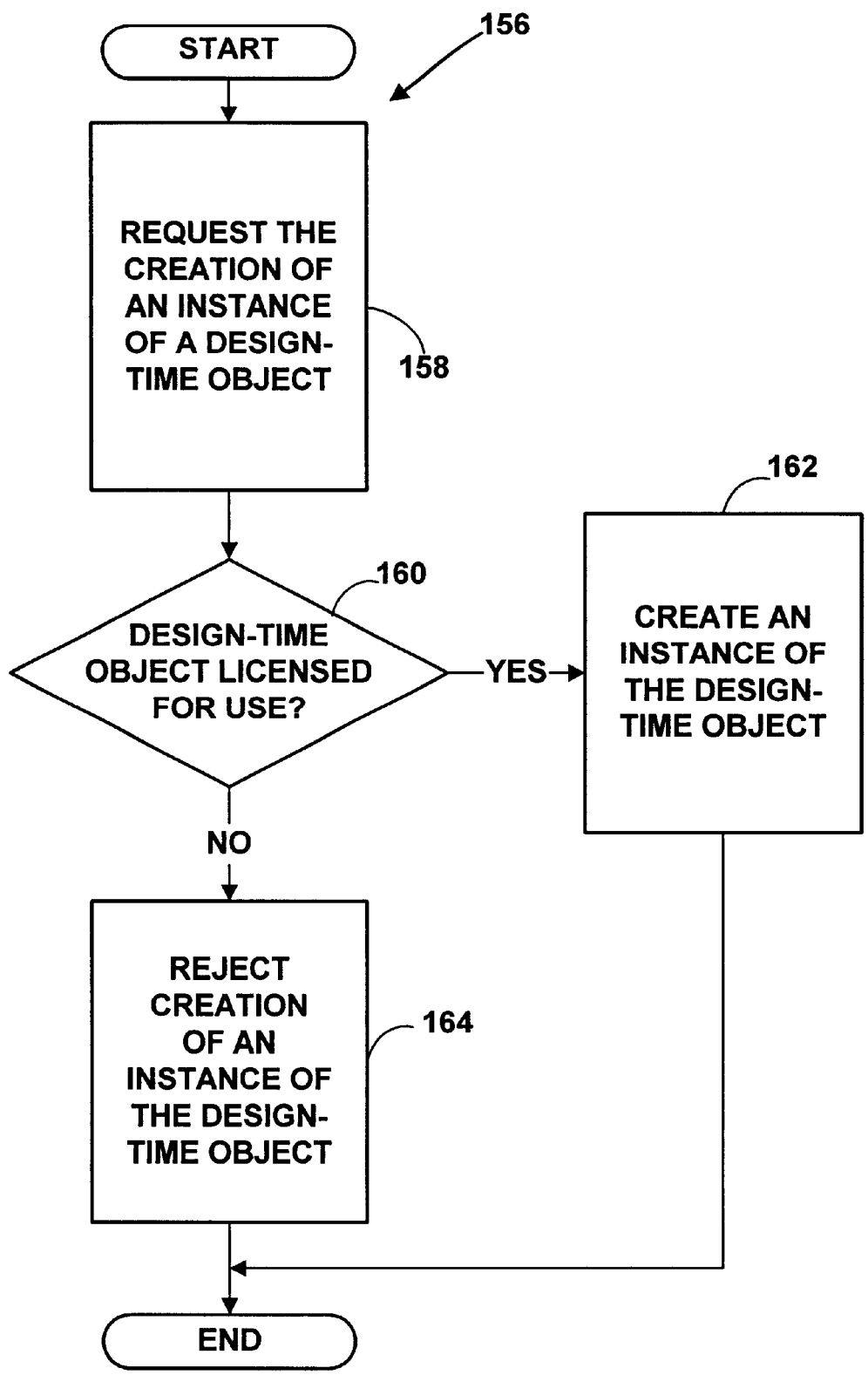
FIG. 11 is a flow diagram illustrating the licensing of a design-time object.

As is shown in FIG. 11, at design-time method 156 is used for licensing design-time object 68. When a developer requests the creation an instance of a design-time object 68, the host environment calls GetLicInfo to verify that the appropriate license is present at step 158 in object designer 62 to create an instance of design-time object 68. If a license is present (or if no license is required) at step 160 to create a design time object 68, an instance of design-time object 68 is created at step 162, and the flag S_OK is returned. If the license is not present at step 160 to create design-time object 68, the creation request is rejected at step 164, and the flag E_NOTLICENSED is returned.

The following pseudo-code example in Table 20 illustrates design-time object licensing.

TABLE 20

```
STDMETHODIMP CClassFactory::GetLicInfo
(
    LICINFO *pLicInfo
)
{
    CHECK_POINTER(pLicInfo);
    pLicInfo->cbLicInfo = sizeof(LICINFO);
    // If true, RequestLicKey will work.
    pLicInfo->fRuntimeKeyAvail = g_fMachineHasLicense;
    // If true, the standard CreateInstance will work.
    pLicInfo->fLicVerified = g_fMachineHasLicense;
    return S_OK
}
```

Figure 12:
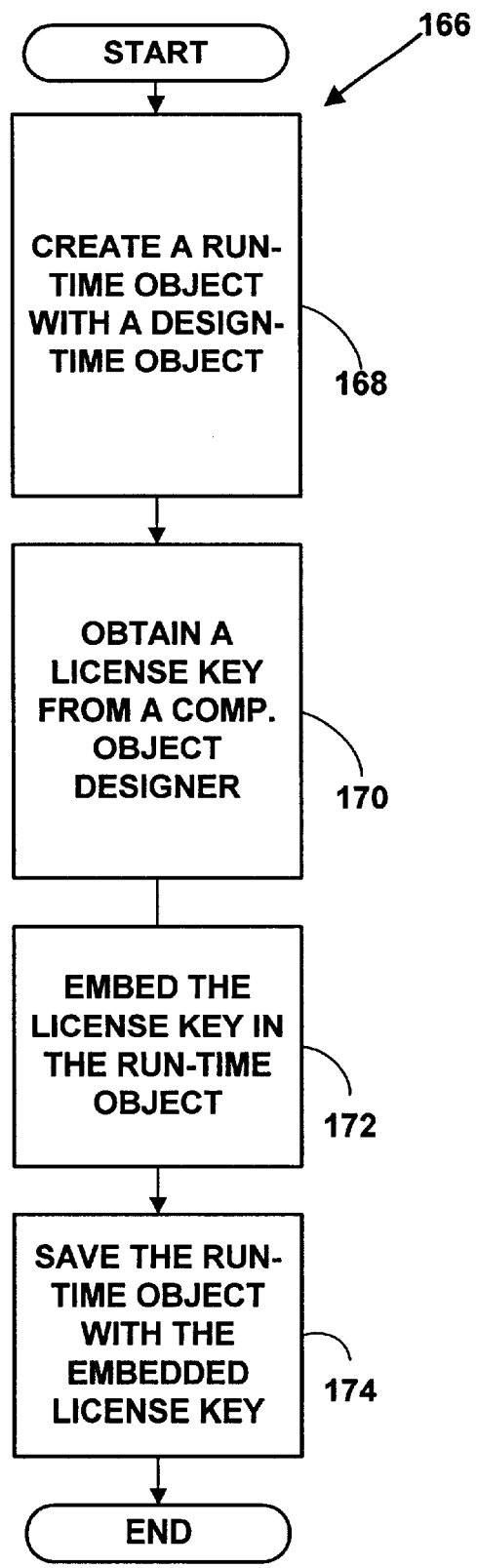
FIG. 12 is a flow diagram illustrating the creation of a run-time object with an embedded license.

However, other licensing methods could also be used.
Creating a Licensed Run-time Object As is shown in FIG. 12, at design-time, method 166 is used for creating a licensed run-time object 72. When design-time object 68 is used to create run-time object 72 at step 168, the host environment calls RequestLicKey to get a license key from object designer 62 to embed into the resulting run-time object 72 at step 170. The license key returned is embedded into run-time object 72 at step 172. Run-time object 72 is then saved with the embedded license key at step 174 in a run-time object persistence state in non-volatile storage as was described above. The following pseudo-code example shown in Table 21 illustrates run-time object licensing.

TABLE 21

```
STDMETHODIMP CClassFactory::RequestLicKey
(
    DWORD dwReserved,
    BSTR *pbstr
)
{
    // If the machine isn't licensed, don't give this to them!
    if (!g_fMachineHasLicense)
        return CLASS_E_NOTLICENSED;
    *pbstr = SysAllocString(g_wszLicenseKey);
    return (*pbstr) ? S_OK: E_OUTOFMEMORY;
}
```

However, other licensing methods could also be used. As with GetLicInfo, RequestLicKey returns the flag CLASS_E_NOTLICENSED if the license key is not valid.

License Verification for the Run-Time Object

Figure 13:
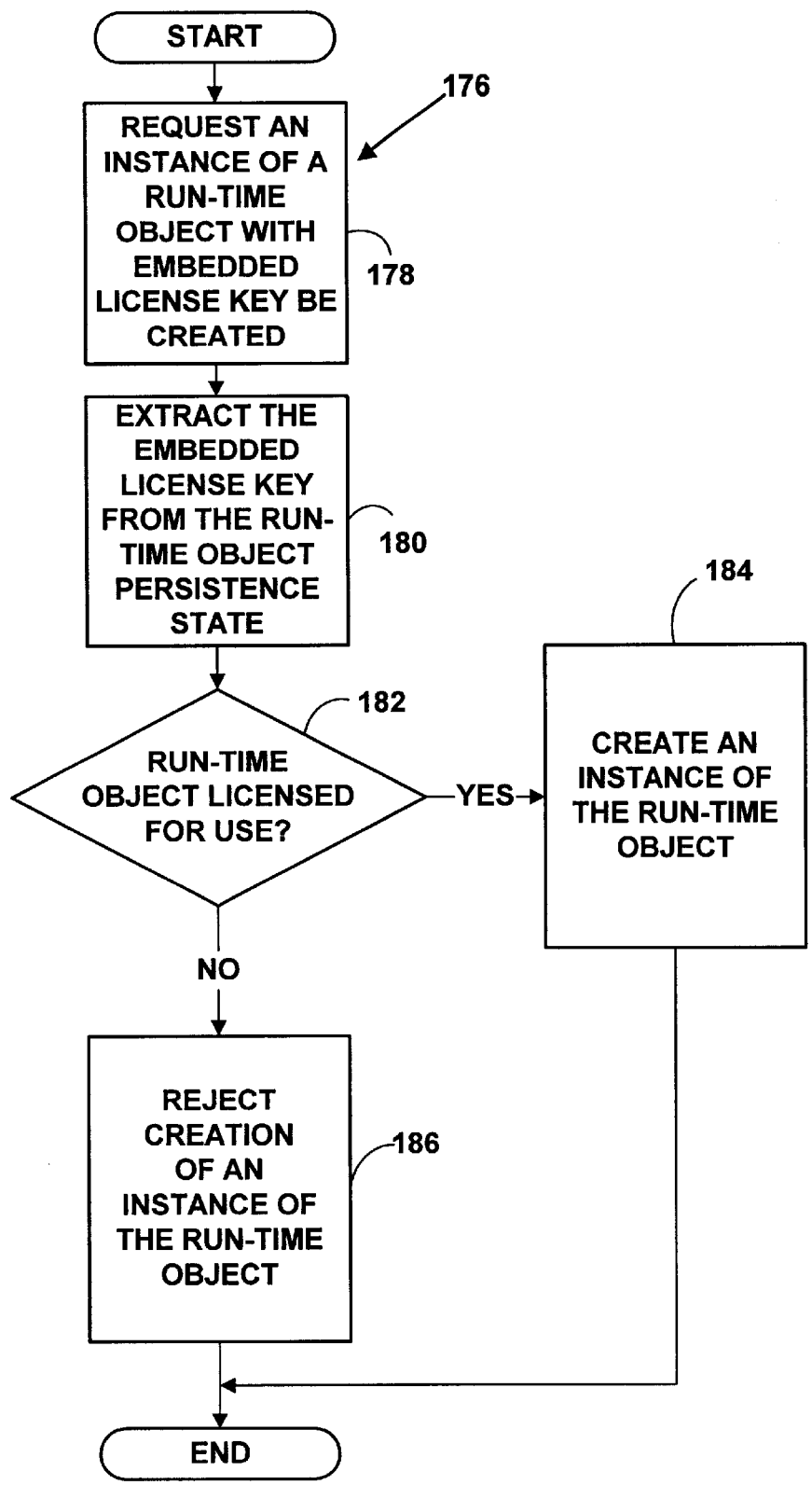
FIG. 13 is a flow diagram illustrating the licensing of a run-time object.

As is shown in FIG. 13, method 176 is used for licensing run-time object 72. Run-time object 72 is selected at step 178. When object designer's 62 run-time object 72 needs to be created, run-time object's 72 license must be verified. The embedded license is extracted from run-time object 72 at step 180 from its run-time object persistence state which was described above. The host environment calls CreateInstanceLic, passing the embedded license key as a parameter. CreateInstanceLic compares the embedded license key with object designer's 62 copy saved with run-time object 72. If the keys match at step 182, CreateInstanceLic creates an instance of run-time object 72 at step 184. If the keys do not match, creation of run-time object 72 is rejected at step 186, and CreateInstanceLk returns CLASS_E_NOTLICENSED.

The following pseudo-code example shown in Table 22 illustrates run-time object license verification.

TABLE 22

```
STDMETHODIMP CClassFactory::CreateInstanceLic
(
    IUnknown *pUnkOuter,
    IUnknown *pUnkReserved,
    REFIID   riid,
    BSTR     bstrKey,
    void     **ppvObjOut
)
{
    BOOL fMatch;
    *ppvObjOut = NULL;
    // See if the key they gave us matches.
    fMatch = (0 == IstrcmpW(g_wszLicenseKey, bstrKey));
    if (!fMatch)
        return CLASS_E_NOTLICENSED;
    // If it does, create the object.
    return CreateOleObjectFromIndex(pUnkOuter, m_iIndex,
        ppvObjOut, riid);
}
```

However, other licensing methods could also be used.

If the host environment passes a key that indicates more restricted capabilities than the user or machine license allows, object designer 62 provides only the limited capabilities for the newly created instance of the object, as if the user or machine license had not been previously verified.

Creating Other Types of Run-Time Files With the Object Designer

Object designer 62 of the present invention can also be used to create run-time files in pre-determined persistence formats that can be used by application programs other than object designer 62. For example, object designer 62 can be used to create run-time files as Hyper Text Markup Language (HTML) files for the Internet or an intranet, picture files, and others. The run-time files are then used by other application programs (e.g., an Internet browser, or a picture viewer, and other applications).

Figure 14:
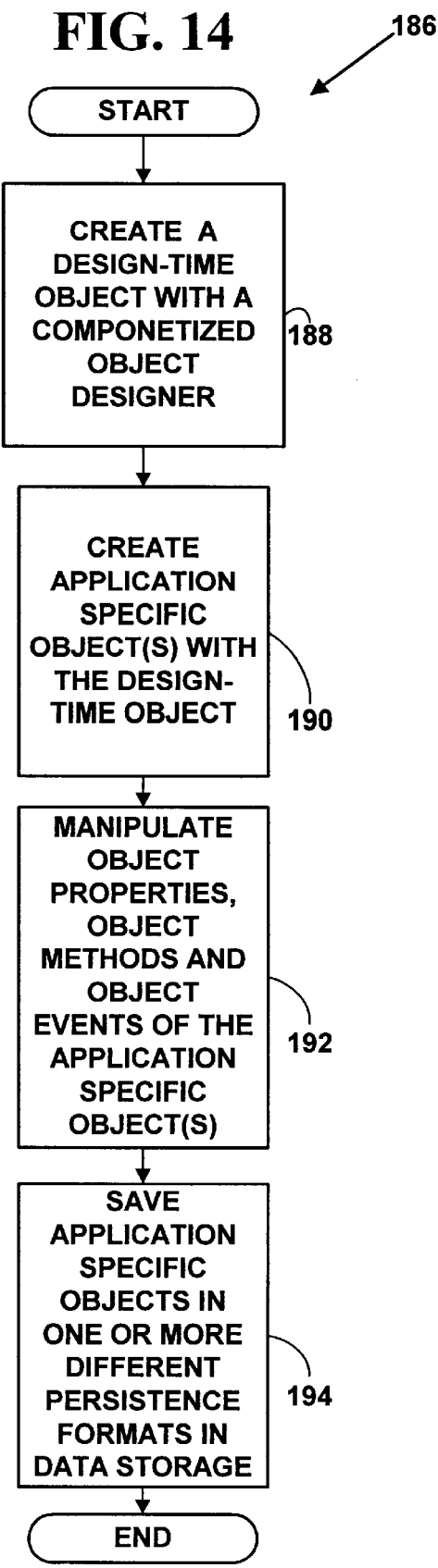
FIG. 14 is a flow diagram illustrating a method for using a componentized object designer to create run-time files in a pre-determined persistence file format.
Figure 15:
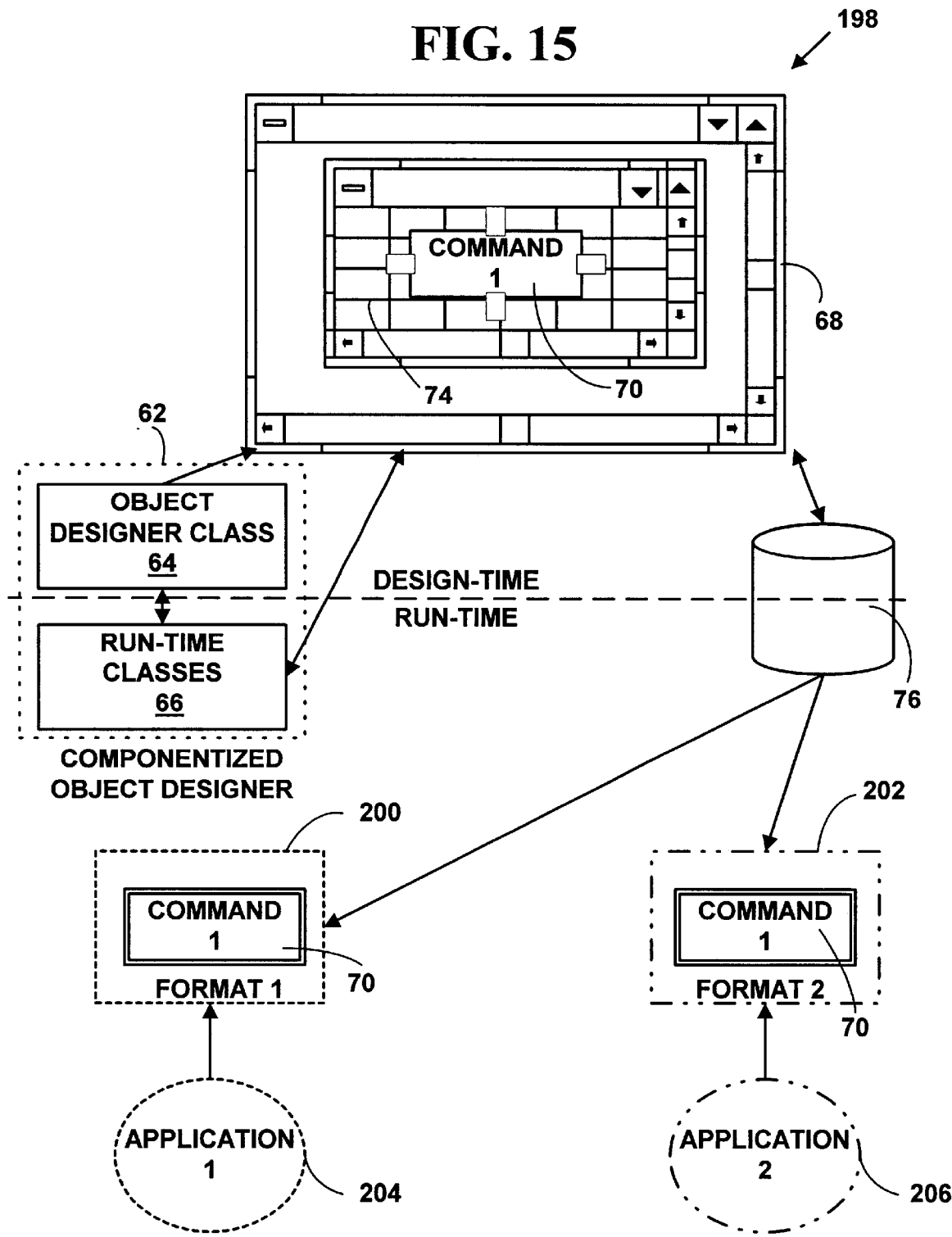
FIG. 15 is a block diagram of a componentized object designer environment illustrating the method of FIG. 14.

FIG. 14 is a flow diagram illustrating a method 186 for using object designer 62 to create run-time files in other formats. FIG. 15 is a block diagram of a componentized object designer environment 198 illustrating the method of FIG. 14. Method 186 includes using the object designer 62 to create an instance of design-time object 68 at step 188. Design-time object 68 is used to create multiple application specific objects 70 at step 190. At step 192, the object properties, object methods, and object events of the application specific objects 70 are manipulated with design-time object 68. At step 194, design-time object 68 stores application specific object data in data storage 76 in a pre-determined persistence (i.e., non-volatile) format desired by another application program (e.g., an Internet browser, or a picture viewer). In FIG. 15, one or more run-time files 200, 202 are created in one or more different formats using the persistence data saved in data store 76. Applications programs 204, 206 other than object designer 62 or design-time object 68 will use the run-time files to view and/or manipulate data stored in run-time files 200, 202.

It should be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of our invention can be applied, it should be understood that the illustrated embodiments are exemplary only, and should not be taken as limiting the scope of our invention. Rather, we claim as our invention all such embodiments as come within the scope and spirit of the following claims and equivalents thereto:

We claim:

1. In a computer system with an object-oriented programming environment having a componentized object designer for designing objects, a method of designing a run-time object for a software application based upon a design-time object that includes customizable dynamic type information, the method comprising:

creating with the componentized object designer a design-time object, the design-time object including dynamic type information;

creating with the design-time object a plurality of application specific objects, wherein the dynamic type information changes in response to the creation of the plurality of application specific objects;

manipulating with the design-time object the plurality of application specific objects, wherein the dynamic type information changes in response to the manipulation; and designing a run-time object based upon the design-time object and the plurality of application specific objects, wherein the run-time object includes the changed dynamic type information.

2. A computer-readable storage medium having stored therein instructions for causing a computer to perform the method of claim 1.

3. The method of claim 1 wherein the designing a run-time object includes optimizing the layout of said run-time object to maximize the performance of said run-time object when it is executed on the computer.

4. The method of claim 3 wherein optimizing includes optimizing the layout of data used to store said run-time object in a run-time object persistence state.

5. The method of claim 1 wherein the designing a run-time object includes designing said run-time object to include a visual user interface.

6. The method of claim 1 wherein the designing a run-time object includes designing said run-time object to lack a visual user interface.

7. The method of claim 1 wherein the componentized object designer is an extended componentized object designer.

8. The method of claim 1 further comprising:

saving the design-time object in a design-time object persistence state; and saving the run-time object in a run-time object persistence state, the run-time object persistence state including object data for only selected ones of the plurality of application specific objects created by the design-time object and less than all of the plurality of application specific objects.

9. The method of claim 1 wherein the designing a run-time object includes designing said run-time object with part of the design-time object, but less than the entire design-time object.

10. The method of claim 1 wherein the design-time object and run-time object include graphical object form data which is used to display graphical forms for a user on a display device coupled to the computer.

11. In a computer system having a first object-oriented programming environment including a first componentized object designer, and a second object-oriented programming environment including a second componentized object designer a method of creating a componentized run-time object that includes objects that are native to and objects that are non-native to the first object-oriented programming environment, the method comprising:

creating with the first object designer a first run-time object including a first set of objects, the first set of objects being native to the first object-oriented programming environment;

creating with the second object designer a second set of objects, the second set of objects being non-native to the first object-oriented programming environment;

replacing selected ones in the first set of objects in the first run-time object with objects from the second set of objects;

saving the first run-time object as a modified run-time object, the modified run-time object including one or more objects that are native to the first object-oriented programming environment, the modified run-time object further including one or more objects that are non-native to the first object-oriented programming environment.

12. A computer readable medium having stored therein instructions for causing a computer to perform the method of claim 11.

13. The method of claim 11 further comprising:
executing the modified run-time object on the computer system using either the first or second object-oriented programming environment.

14. The method of claim 11 further comprising:

creating a first design-time object with the first object designer including a third set of objects, the third set of objects being native to the first object-oriented programming environment;

creating a fourth set of objects with the second object designer, the fourth set of objects being non-native to the first object-oriented programming environment;

replacing selected ones in the third set of objects in the first design-time object with objects from the fourth set of objects;

saving the first design-time object as a modified design-time object, the modified design-time object including one or more objects that are native to the first object-oriented programming environment, the modified design-time object further including one or more objects that are non-native to the first object-oriented programming environment.

15. The method of claim 14 wherein the modified design-time object is capable of being executed on the computer system using either the first or second object-oriented programming environment.

16. In a computer system with an object-designer capable of creating objects with one or more object-oriented programming models, an object-oriented data structure in memory of the computer system which provides access to a run-time object, the object-oriented data structure including an object-oriented interface with a plurality of object interface members usable by one or more of the objects to manipulate the run-time object, the object-oriented data structure comprising:

an object-oriented interface member for returning an extensibility object of an object designer;

an object-oriented interface member for returning an object class identifier for a run-time object;

an object-oriented interface member for returning status flags of a run-time object;

an object-oriented interface member for identifying an object persistence interface supported by an object-designer for saving data either to a pre-determined file format or to be consumed by a run-time object;

an object-oriented interface member for saving object information necessary to create a run-time object; and an object-oriented interface member for returning dynamic object type information which describes a run-time object.

17. A componentized object designer apparatus comprising:

program storage and execution means;

object designer means for creating a design-time object, the object designer means supporting design-time object functionality;

means for creating objects with the design-time object; and one or more run-time object class means for creating run-time objects based upon the design-time object, each of the one or more run-time object class means supporting only part of the design-time object functionality to decrease run-time object size.

18. The apparatus of claim 17 wherein the object designer means includes:

means for interfacing with object services;

means for creating new objects; and means for interfacing with new created objects.

19. In a computer system with an object-oriented programming environment having a componentized object designer for designing objects, a method of designing run-time files for a software application, the method comprising:

creating with the componentized object designer a design-time object;

loading design-time object information from persistent storage, the design-time object information in an object designer persistence format;

creating with the design-time object a plurality of application specific objects for a software application;

manipulating with the design-time object the plurality of application specific objects; and based upon the design time object and the plurality of application specific objects, creating a run-time file in a persistence format other than the object designer persistence format, the run-time file usable by an application program other than the componentized object designer.

20. A computer-readable storage medium having stored therein instructions for causing a computer to perform the method of claim 19.

21. The method of claim 19 further comprising:
upon receiving a selection input from an application program other than the componentized object designer, providing a run-time file based on the selection input and in a persistence format usable by the application program.

22. In a computer system, a method for designing a run-time object of a run-time object class for a software application, the method comprising:

creating a design-time object of a design-time object class, the design-time object including persistable data, the design-time object class supporting design-time object functionality;

storing the persistable data in a persistence state for loading by a run-time object;

designating a run-time object class for the run-time object, the run-time object class differing from the design-time object class, wherein the run-time object class supports only part of the design-time object functionality, thereby decreasing run-time object size.

23. The method of claim 22 further comprising:

providing an object designer that includes the design-time object class and the run-time object class.

24. The method of claim 22 wherein the persistable data includes dynamic type information, the method further comprising:

after creating the design-time object, changing the dynamic type information.

25. The method of claim 22 wherein storing the persistable data comprises:

storing the persistable data in a format that differs from a design-time object format.

26. A computer-readable storage medium having stored therein instructions for causing a computer to perform the method of claim 22.

27. A computer-readable medium having stored therein instructions for performing a method of reducing the size of a run-time object by eliminating persistently stored type information that is unnecessary at run-time, the persistently stored type information included in a design-time object upon which the run-time object is based, the method comprising:

creating a design-time object;

loading from persistent storage type information for the design-time object, the loaded type information providing a design-time object type information state;

removing type information from the loaded type information to reduce run-time object size;

storing in persistent storage remaining type information for loading by a run-time object, the remaining type information comprising a run-time object type information state.

28. In a computer system, a method of designing a run-time object for a software application based upon a design-time object that includes customizable dynamic type information, the method comprising:

instantiating a design-time object of a design-time object class, the design-time object including dynamic type information;

during the lifetime of the design-time object, changing said dynamic type information to customize for a software application said dynamic type information;

designing a run-time object for the software application, the run-time object including said changed dynamic type information.

29. A computer-readable storage medium having stored therein instructions for causing a computer to perform the method of claim 28.

30. The method of claim 28 wherein said dynamic type information includes one or more object properties.

31. The method of claim 28 wherein said dynamic type information includes one or more object methods.

32. The method of claim 28 wherein said dynamic type information includes one or more object events.

33. The method of claim 28 wherein the designing a run-time object includes altering layout of said run-time object to improve performance of said run-time object when executed.

34. The method of claim 28 further comprising:

saving portions of said dynamic type information in a run-time object persistence state, the portions consisting of part of said dynamic type information.

35. A computer-readable medium having stored thereon instructions for performing a method of designating at design time a run-time object class for a software application, the run-time object class supporting only part of a design-time object functionality, the method comprising:

providing an object designer that includes a design-time object class and one or more run-time object classes;

creating a design-time object of the design-time object class, the design-time object class supporting design-time object functionality;

designating a run-time object class from among the one or more run-time object classes, the designated run-time object class supporting only part of the design-time object functionality, thereby decreasing run-time object size for the software application.

36. The computer-readable medium of claim 35 wherein the design-time object class includes a set of methods, and wherein the designated run-time object class includes only part of the set of methods.

37. The computer-readable medium of claim 35 wherein the design-time object class includes a set of properties, and wherein the designated run-time object class includes only part of the set of properties.

38. The computer-readable medium of claim 35 wherein the design-time object class supports a visual user interface, and wherein the designated run-time object class does not support the visual user interface.

* * * * *